US012174555B2

(12) United States Patent
Fukasawa et al.

(10) Patent No.: US 12,174,555 B2
(45) Date of Patent: Dec. 24, 2024

(54) DEVELOPING DEVICE

(71) Applicant: CANON KABUSHIKI KAISHA, Tokyo (JP)

(72) Inventors: Yu Fukasawa, Tokyo (JP); Takuya Kawakami, Shizuoka (JP); Yuji Kawaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/506,948

(22) Filed: Nov. 10, 2023

(65) Prior Publication Data

US 2024/0077812 A1 Mar. 7, 2024

Related U.S. Application Data

(63) Continuation of application No. 17/592,399, filed on Feb. 3, 2022, now Pat. No. 11,841,636, which is a continuation of application No. 17/122,409, filed on Dec. 15, 2020, now Pat. No. 11,275,326.

(30) Foreign Application Priority Data

Dec. 27, 2019 (JP) ................................ 2019-239033

(51) Int. Cl.
*G03G 15/08* (2006.01)

(52) U.S. Cl.
CPC ..... *G03G 15/0812* (2013.01); *G03G 15/0881* (2013.01)

(58) Field of Classification Search
CPC ........... G03G 15/0812; G03G 15/0817; G03G 15/0898
See application file for complete search history.

(56) References Cited

FOREIGN PATENT DOCUMENTS

| | | | | | |
|---|---|---|---|---|---|
| JP | 2004086057 A | * | 3/2004 | ......... | G03G 15/0812 |
| JP | 2006039430 A | * | 2/2006 | ......... | G03G 15/0812 |
| JP | 2015069166 A | * | 4/2015 | ............. | B23K 26/08 |
| JP | 2015081957 A | * | 4/2015 | ........... | G03G 15/081 |
| JP | 2021107867 A | | 7/2021 | | |

* cited by examiner

*Primary Examiner* — Walter L Lindsay, Jr.
*Assistant Examiner* — Andrew V Do
(74) *Attorney, Agent, or Firm* — Canon U.S.A., Inc. IP Division

(57) ABSTRACT

A developing device includes a developing member to carry developer stored by a developing frame, and a regulating blade having a support plate fixed to the developing frame, a plate-like member, and a regulating member. One end portion of the plate-like member is opposed to the developing member, and the other end portion is welded to the support plate. The regulating member is fixed to a plate-like member surface, and contacts the developing member to regulate a developer thickness on a developing surface. The regulating member is provided with a recessed portion recessed at a regulating member end portion. The regulating member end portion is lower than a regulating member central portion. A plate-like member region welded to the support plate is located at the plate-like member other end portion and overlaps the regulating member central portion and the regulating member end portion at which the recessed portion is provided.

4 Claims, 11 Drawing Sheets

DEVELOPING DEVICE

CROSS REFERENCE TO RELATED APPLICATIONS

This application is a continuation of U.S. patent application Ser. No. 17/592,399, filed on Feb. 3, 2022, which is a continuation of U.S. patent application Ser. No. 17/122,409, filed on Dec. 15, 2020, and issued as U.S. Pat. No. 11,275,326 on Mar. 15, 2022, which claims priority from Japanese Patent Application No. 2019-239033, filed Dec. 27, 2019, each of which are hereby incorporated by reference herein in their entirety.

BACKGROUND

Field

The present disclosure relates to a developing device used for an image forming apparatus.

Description of the Related Art

As a developing device used for an image forming apparatus, the following configuration is used. Japanese Patent Application Laid-Open No. 2011-133768 discusses a developing device including a rotatable developing roller and a layer thickness regulating blade that contacts a peripheral surface of the developing roller.

In the developing device discussed in Japanese Patent Application Laid-Open No. 2011-133768, the layer thickness regulating blade is formed of a blade that regulates a layer thickness, and a support member that supports the blade. The blade and the support member are fixed by welding. Japanese Patent Application Laid-Open No. 2011-133768 discusses a configuration in which the blade and the support member are not welded at a blade end portion in a rotational axis direction of the developing roller.

Regarding the configuration discussed in Japanese Patent Application Laid-Open No. 2011-133768, if blade end portions are not welded in a welding range of the layer thickness regulating blade, a contact pressure at the blade end portions decreases and developer is more likely to leak from a developing frame. Developer leaking to the outside of the developing device may contaminate the developing device.

SUMMARY

The present disclosure is directed to reducing leakage of developer from a developing frame, while maintaining a uniform thickness of a developer layer in a developer coat region on a developing roller in a case where a layer thickness regulating blade is fixed by welding.

According to an aspect of the present disclosure, a developing device to be used for an image forming apparatus includes a developing frame configured to store developer, a developing member configured to rotate and to carry the developer, and a regulating blade having a support plate, a plate-like member, and a regulating member, wherein the support plate extends in a rotational axis direction of the developing member and is fixed to the developing frame, wherein the plate-like member extends in the rotational axis direction and is supported on the support plate, wherein one end portion of the plate-like member in a direction crossing the rotational axis direction is opposed to the developing member, and the other end portion of the plate-like member in the direction crossing the rotational axis direction is welded to the support plate, wherein the regulating member extends in the rotational axis direction, is fixed to a surface of the plate-like member opposed to the developing member at the one end portion of the plate-like member, and contacts the developing member to regulate a layer thickness of developer on a surface of the developing member, wherein the regulating member is provided with a recessed portion recessed at an end portion of the regulating member in the rotational axis direction from the one end portion toward the other end portion of the plate-like member, and the end portion of the regulating member in the rotational axis direction is lower than a central portion of the regulating member, and wherein a region of the plate-like member welded to the support plate is located at the other end portion of the plate-like member in the direction crossing the rotational axis direction and overlaps each of the central portion of the regulating member in the rotational axis direction and the end portion of the regulating member at which the recessed portion is provided.

Further features of the present disclosure will become apparent from the following description of exemplary embodiments with reference to the attached drawings.

DESCRIPTION OF THE EMBODIMENTS

Modes for carrying out the present disclosure will be described in detail by way of example with reference to the drawings. Functions, materials, and shapes of components described in exemplary embodiments, the relative arrangement of the components, and the like are not intended to limit the scope of the present disclosure only to these examples, unless specified otherwise. The functions, materials, shapes, and the like described once in the following description are similar to those described first, unless specified otherwise.

In the following description, a direction in which an axis of a developing roller extends is referred to as a "first direction", a "longitudinal direction", a "rotational axis direction", or "longitudinal". A vertical direction that crosses the first direction in a state where an image forming apparatus is installed on a horizontal plane is referred to as a "second direction". A direction that crosses each of the first direction and the second direction is referred to as a "third direction". The first direction and the second direction cross each other and are preferably perpendicular to each other. The second direction and the third direction cross each other and are preferably perpendicular to each other. The third direction and the first direction cross each other and are preferably perpendicular to each other.

In the following description, a side of the image forming apparatus on which a front door is provided is referred to as a front-surface side, and a side opposite to the front-surface side is referred to as a back-surface side. A left side of the image forming apparatus as viewed from the front-surface side is referred to as a drive side, and a right side of the image forming apparatus as viewed from the front-surface side is referred to as a non-drive side.

A developing device according to a first exemplary embodiment of the present disclosure will be described with reference to the drawings.

Configuration of Electrophotographic Image Forming Apparatus

Figure 2:
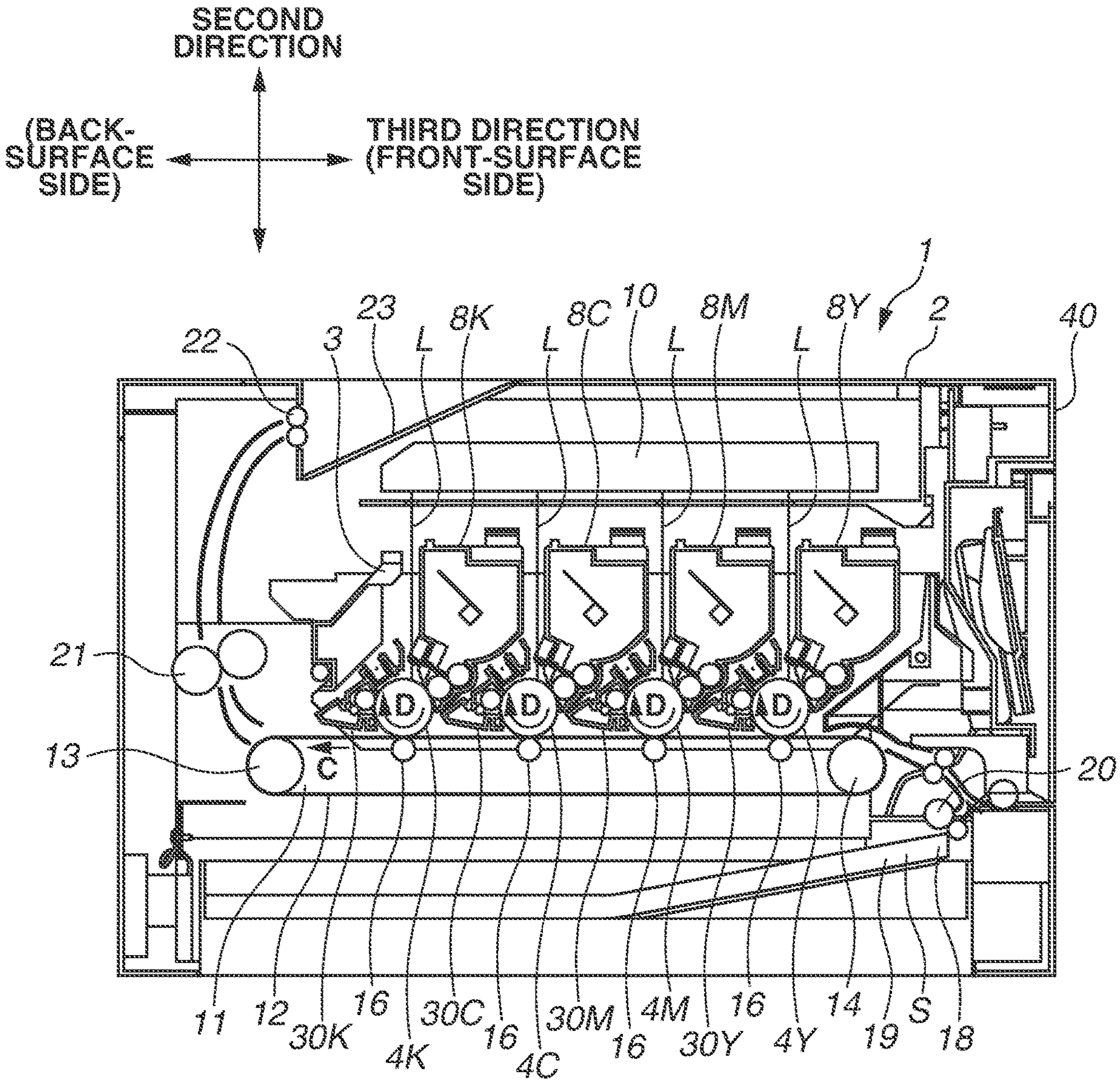
FIG. 2 is a sectional view of an image forming apparatus according to the first exemplary embodiment.
Figure 3A:
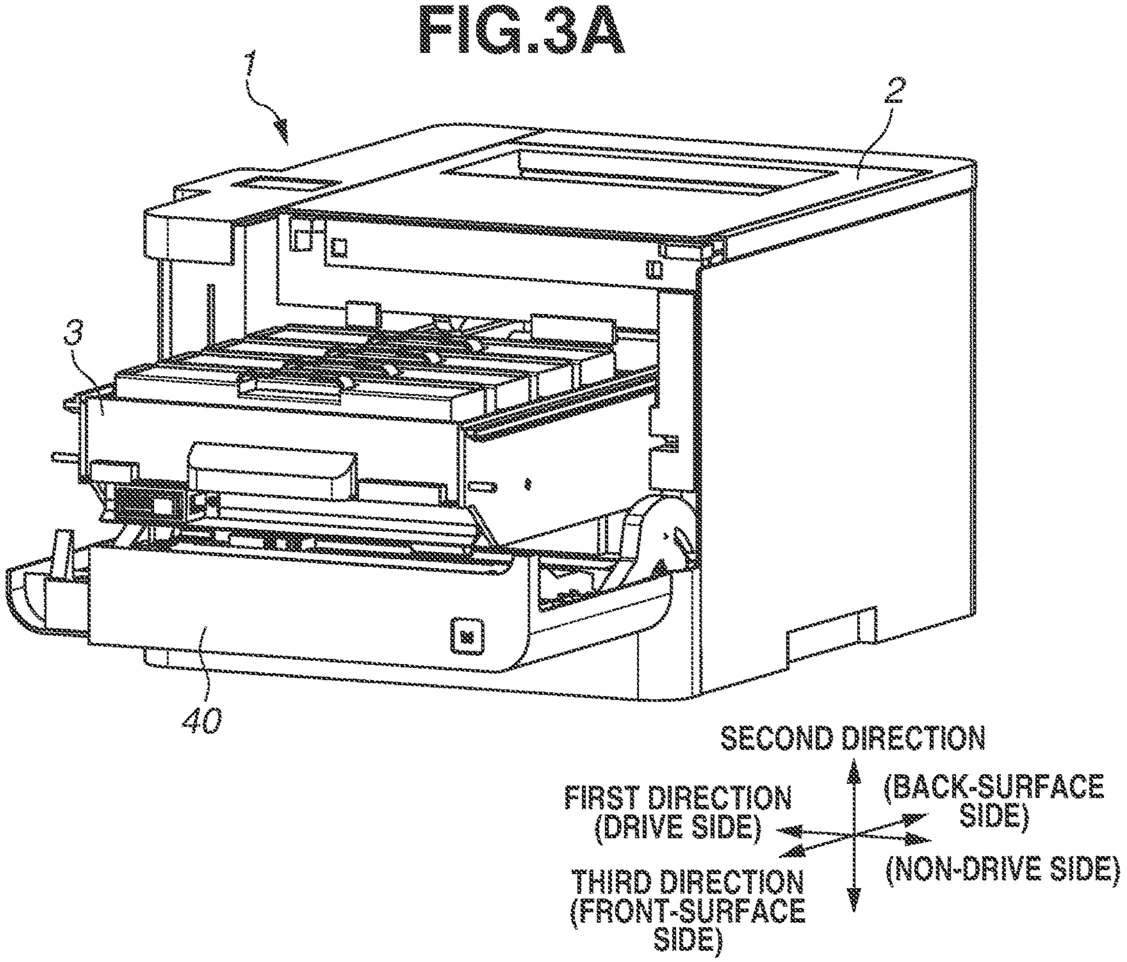
FIGS. 3A and 3B are perspective views of the image forming apparatus according to the first exemplary embodiment.
Figure 3B:
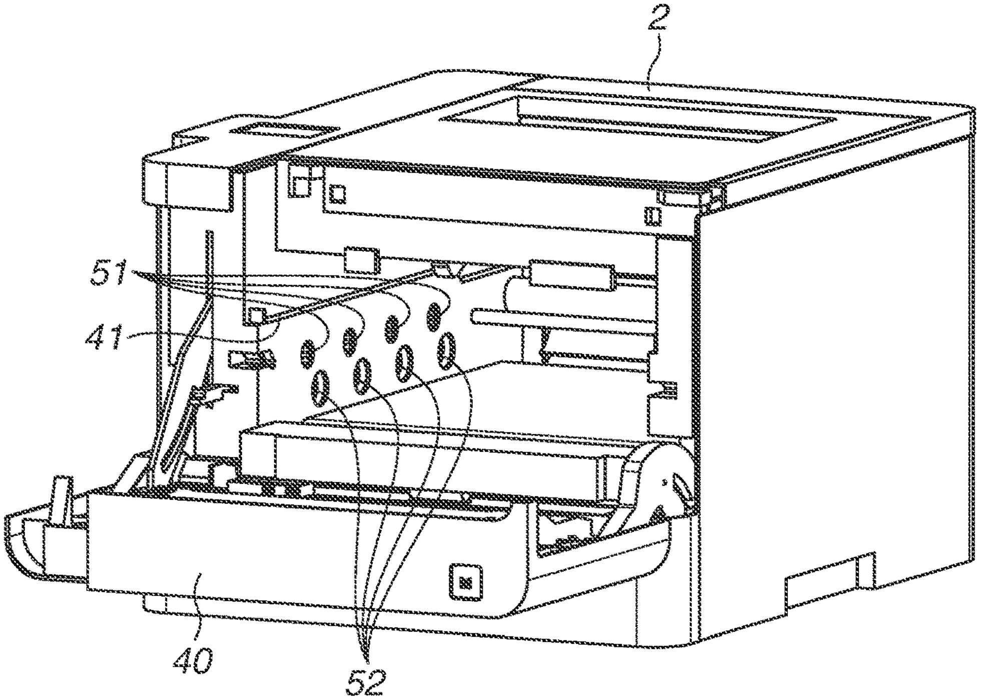
Figure 4:
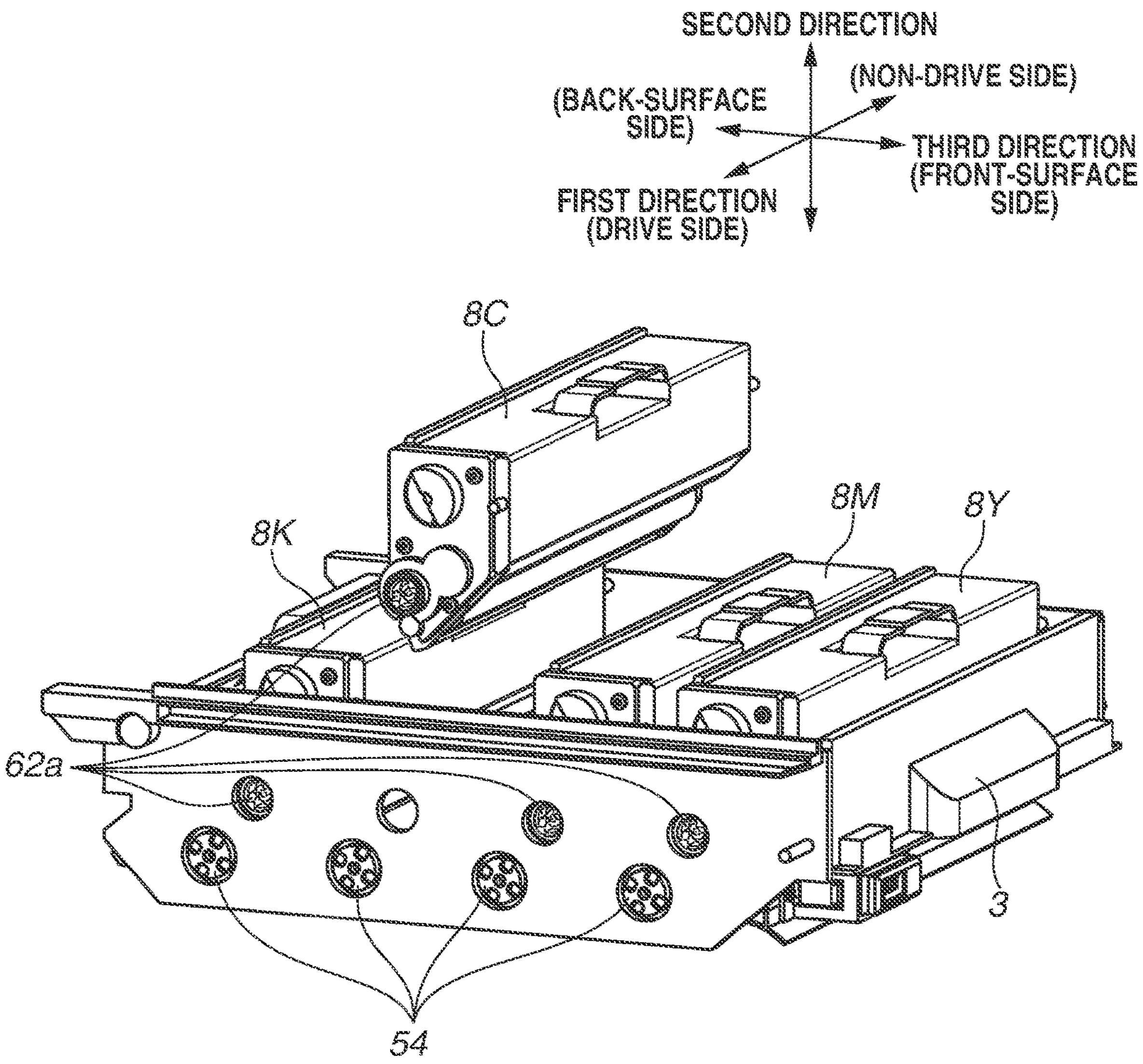
FIG. 4 is a perspective view illustrating a cartridge tray and the developing cartridge according to the first exemplary embodiment.
Figure 5:
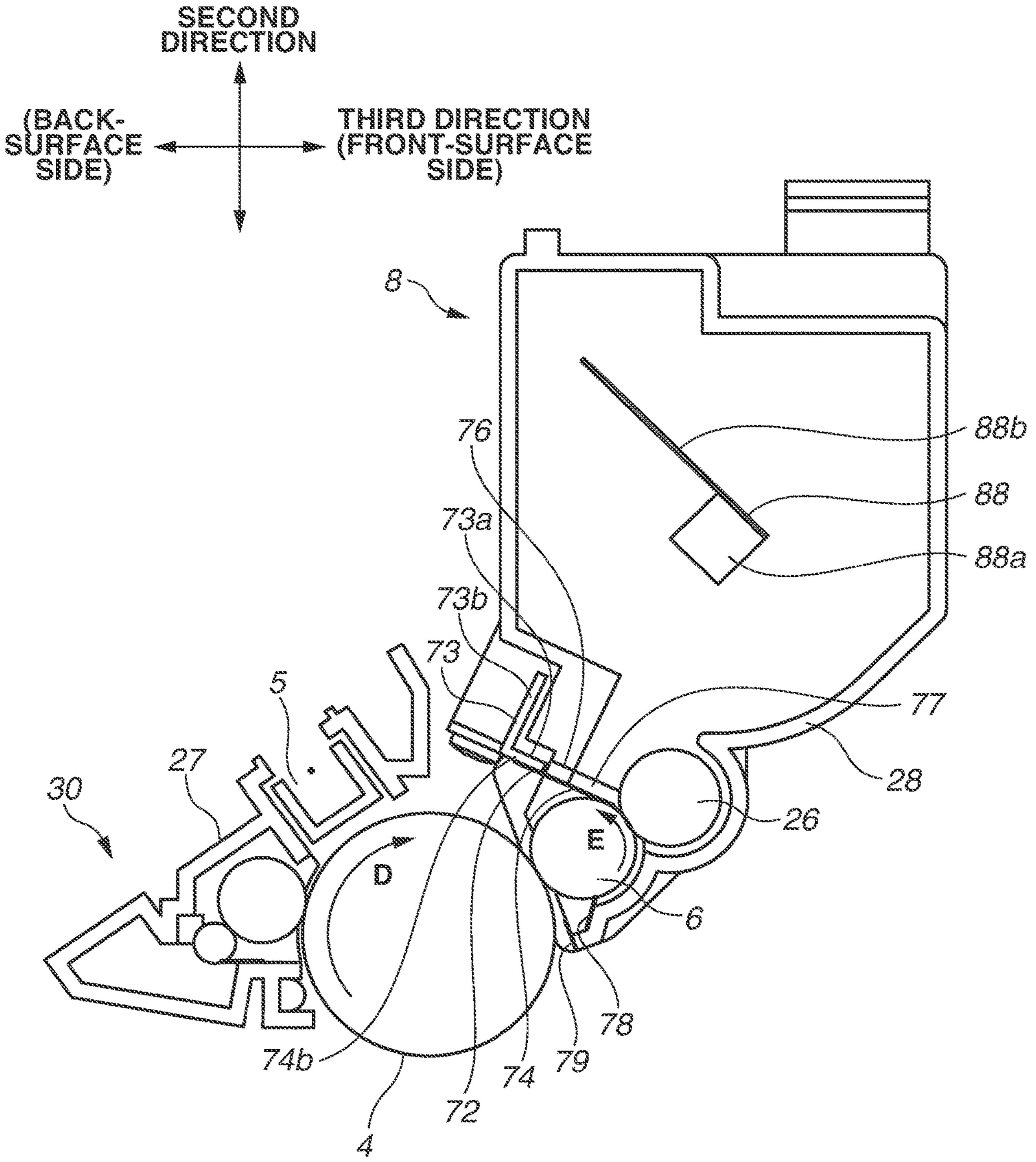
FIG. 5 is a sectional view illustrating the developing cartridge and a drum unit according to the first exemplary embodiment.

A configuration of an electrophotographic image forming apparatus will now be described. FIG. 2 is a sectional view of an electrophotographic image forming apparatus 1 (hereinafter referred to as the "image forming apparatus 1") according to the first exemplary embodiment. FIGS. 3A and 3B are perspective views each illustrating the image forming apparatus 1 according to the first exemplary embodiment. FIG. 3A illustrates a state where a front door 40 of the image forming apparatus 1 is opened and a cartridge tray 3 is pulled out. In FIG. 3B, the illustration of the cartridge tray 3 is omitted. FIG. 4 is a perspective view illustrating the cartridge tray 3 and developing cartridges 8Y, 8M, 8C, and 8K serving as developing devices each according to the first exemplary embodiment. FIG. 5 is a sectional view illustrating a developing cartridge 8 and a drum unit 30 according to the first exemplary embodiment. FIGS. 2 and 5 are sectional views taken along a direction vertical to a rotational axis direction of a developing roller 6 serving as a developing member.

The image forming apparatus 1 illustrated in FIG. 2 is a color laser printer using an electrophotographic image forming process. Developer (e.g., toner) supplied from the developing cartridges 8 (8Y, 8M, 8C, and 8K) each serving as the developing device is used to form a color image on a recording medium S (e.g., a print sheet recording media). The first exemplary embodiment illustrates an example where a color image is formed by four photosensitive drums 4 (4Y, 4M, 4C, and 4K) and four developing cartridges 8 (8Y, 8M, 8C, and 8K). The four developing cartridges 8 store developer of different colors (e.g., yellow, cyan, magenta, and black). The number of the developing cartridges 8, the photosensitive drums 4, and the like may be one, two, three, or five or more depending on the number of colors to be used. In the first exemplary embodiment, the configuration and operation of each of the photosensitive drums 4 (4Y, 4M, 4C, and 4K) and the developing cartridges 8 (8Y, 8M, 8C, and 8K) are substantially the same except for the colors to be used to form an image. Unless specific distinction is required, the photosensitive drums 4 and the developing cartridges 8 will therefore be described in general, omitting Y, M, C and K. Specifically, in the first exemplary embodiment, the image forming apparatus 1 includes, as a plurality of image carrying members, four photosensitive drums 4 and four developing cartridges 8, which are provided side by side in a direction crossing the vertical direction.

The image forming apparatus 1 includes an electrophotographic image forming apparatus body 2 (hereinafter referred to as the "apparatus body 2"), the photosensitive drums 4, the cartridge tray 3 detachably mountable on the apparatus body 2, and the developing cartridges 8 detachably mountable on the cartridge tray 3.

The apparatus body 2 includes an exposure device 10, an electrostatic transfer device 11, a sheet feed unit 18, a fixing device 21, a discharge unit 22, and the front door 40.

The exposure device 10 is provided above the developing cartridges 8 and the cartridge tray 3, and outputs a laser beam L corresponding to image information. The laser beam L is used to perform scanning exposure on a surface of each photosensitive drum 4 (4Y, 4M, 4C, and 4K).

The developing cartridges 8 each serving as the developing device develop, with the developer, the surface of the photosensitive drum 4 on which scanning exposure has been performed. A development process in which a developer image is formed on the surface of each photosensitive drum 4 will be described below.

The electrostatic transfer device 11 includes a transfer belt 12 provided below the developing cartridges 8 and the cartridge tray 3. The transfer belt 12 is opposed to and in contact with all the photosensitive drums 4 and is moved in a circulating manner. As the transfer belt 12, a resin film or a multilayer-film-like member provided with a resin layer on a rubber base layer is used. The transfer belt 12 is stretched over a drive roller 13 and a driven roller 14. The recording medium S is electrostatically adsorbed on an outer peripheral surface of the transfer belt 12 that is located on the upper side illustrated in FIG. 2. The transfer belt 12 moves in a circulating manner to bring the recording medium S into contact with each photosensitive drum 4. Thus, the recording medium S is conveyed toward the photosensitive drum 4. Transfer rollers 16 contacting the inside of the transfer belt 12 are provided side by side at positions opposed to the photosensitive drums 4. A predetermined bias is applied to the transfer rollers 16 during transfer, and electric charges are applied to the recording medium S through the transfer belt 12. An electric field generated in this case causes the developer image formed on the surface of each photosensitive drum 4 to be transferred onto the recording medium S that is in contact with each photosensitive drum 4.

The sheet feed unit 18 is provided below the electrostatic transfer device 11. The sheet feed unit 18 includes a sheet feed tray 19 on which the recording medium S is placed and stored, and a sheet feed roller 20.

The fixing device 21 and the discharge unit 22 are provided above the apparatus body 2. The fixing device 21 fixes the developer image transferred onto the recording medium S by heating and pressing. The discharge unit 22 discharges the recording medium S, which has passed through the fixing device 21, a discharge tray 23.

The cartridge tray 3 includes drum units 30 (30Y, 30M, 30C, 30K) which are provided with the photosensitive drums 4 each corresponding to the four developing cartridges 8. As illustrated in FIG. 5, each drum unit 30 includes a drum frame 27 and a charging device 5.

After the front door 40 of the image forming apparatus 1 is opened, the cartridge tray 3 is configured to be withdrawn to the front-surface side in the third direction along a tray drawer rail 41, which is provided in the image forming apparatus 1, as illustrated in FIGS. 3A and 3B.

As illustrated in FIG. 5, each developing cartridge 8 includes a developing frame 28, which stores developer, and the developing roller 6. The developing roller 6, which is rotatable about a rotation axis extending in the first direction, carries developer on the peripheral surface of the developing roller 6. The developing cartridge 8 includes a supply roller 26 that supplies developer to the developing roller 6, and a layer thickness regulating blade 72. The layer thickness regulating blade 72 contacts a peripheral surface of the developing roller 6 and regulates the thickness of developer carried on the surface of the developing roller 6.

As illustrated in FIG. 4, the developing cartridges 8 are detachably mountable on the cartridge tray 3 in the second direction. FIG. 4 illustrates an example where the developing cartridge 8C is pulled out from the cartridge tray 3. In this manner, the developing cartridges 8 are detachably mountable in four slots provided in the cartridge tray 3. This configuration enables a user to replace a developing cartridge 8 depending on a use state.

Image Forming Process

An image forming process will now be described with reference to FIGS. 2 and 5.

During execution of the image forming process, each photosensitive drum 4 is rotationally driven in a direction indicated by an arrow D illustrated in FIGS. 2 and 5 at a predetermined speed. The transfer belt 12 of the electrostatic transfer device 11 is also rotationally driven in a direction indicated by an arrow C at a speed corresponding to the speed of each photosensitive drum 4. First, the surface of each photosensitive drum 4 is uniformly charged to a predetermined polarity and potential by the charging device 5. The exposure device 10 then outputs the laser beam L corresponding to an image signal of each color, and performs scanning exposure on the surface of each photosensitive drum 4. An electrostatic latent image corresponding to the image signal of each color is thereby formed on the surface of each photosensitive drum 4.

Developer stored in the developing frame 28 is bore on the developing roller 6 that is rotationally driven in a direction of an arrow E at a predetermined speed as illustrated in FIG. 5. Developer carried on the surface of the developing roller 6 is supplied to the surface of the developing roller 6 by the supply roller 26. The developer supplied to the surface of the developing roller 6 enters a space between the developing roller 6 and the layer thickness regulating blade 72, and the developer is carried on the surface of the developing roller 6 as a thin layer with a certain thickness. The developer carried on the surface of the developing roller 6 is supplied to the electrostatic latent image formed on the surface of the photosensitive drum 4. The developer thereby adheres to the electrostatic latent image, and the electrostatic latent image is developed (visualized), so that the developer image is formed on the surface of the photosensitive drum 4. In the first exemplary embodiment, the polarity of developer is set to a positive polarity. Accordingly, a voltage of a positive polarity relative to the potential of the electrostatic latent image formed on the surface of the photosensitive drum 4 is applied to the developing roller 6 from a developing power supply (not illustrated). By the above-described setting, the developer charged to the positive polarity moves from the developing roller 6 to the electrostatic latent image formed on the surface of the photosensitive drum 4.

The recording media S are separated one by one and fed at a predetermined control timing. The recording medium S moves to a transfer portion a point where a leading edge of a developer image formed on the peripheral surface of the first photosensitive drum 4Y is opposed to the transfer belt 12. The timing when the recording medium S is conveyed to the transfer portion is synchronized with the rotation of the photosensitive drum 4, and the recording medium S is conveyed to the transfer belt 12 at the predetermined control timing so as to match a print start position at the transfer portion. Developer images formed on the surfaces of the photosensitive drums 4 are sequentially transferred onto the recording medium S, which is electrostatically adsorbed and conveyed by the transfer belt 12, by an electric field formed between each photosensitive drum 4 and the transfer roller 16. At this time, a voltage of a negative polarity, which is a polarity opposite to the positive polarity, is applied to the transfer roller 16 from a transfer power supply (not illustrated). This makes it possible to electrically attract the developer of the positive polarity to the recording medium S.

The recording medium S onto which four color developer images are transferred is separated from the surface of the transfer belt 12 and is conveyed to the fixing device 21. The developer images are thermally fixed onto the recording medium S by the fixing device 21. The recording medium S is then discharged onto the discharge tray 23 by the discharge unit 22.

Residual developer that has not been transferred and remains on the surface of the photosensitive drum 4 is collected and reused in the developing cartridge 8. Specifically, the surface of the photosensitive drum 4 is charged to the positive polarity once by the charging device 5, and the potential on the surface of the photosensitive drum 4 is increased toward the positive polarity so that the potential on the surface of the photosensitive drum 4 becomes higher than the voltage applied to the developing roller 6. Thus, when the residual developer charged to the positive polarity on the surface of the photosensitive drum 4 is moved to the portion opposed to the developing roller 6, the residual developer is electrically collected into the developing frame 28.

Detailed Configurations of Drum Units and Developing Cartridges

Figure 6:
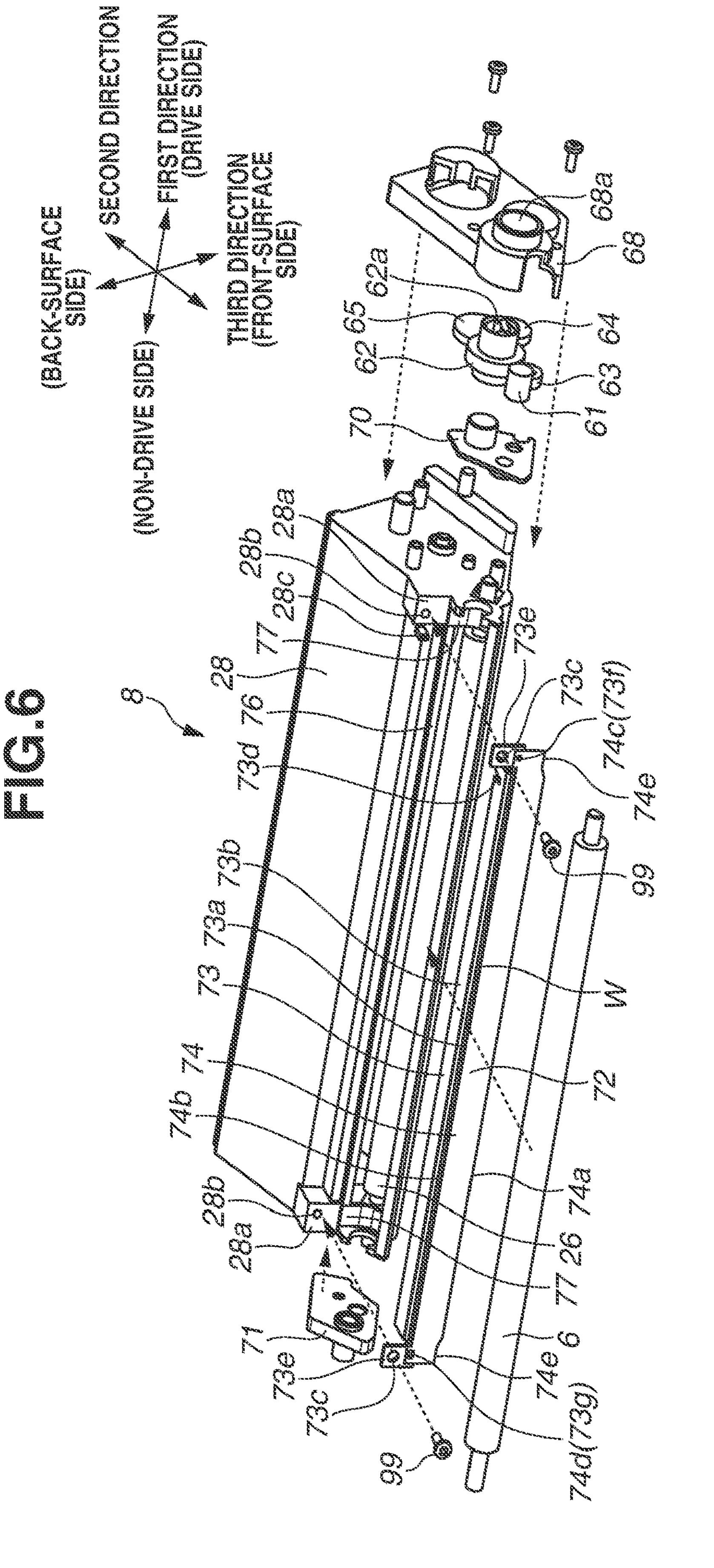
FIG. 6 is an exploded perspective view of the developing cartridge according to the first exemplary embodiment.

Detailed configurations of the drum unit 30 and the developing cartridge 8 will now be described with reference to FIGS. 5 and 6. FIG. 6 is an exploded perspective view of the developing cartridge 8. In FIG. 6, a direction in which each component is mounted is indicated by an arrow.

As illustrated in FIG. 5, the drum unit 30 includes the photosensitive drum 4, the drum frame 27, and the charging device 5 as described above. The photosensitive drum 4 is attached to the drum frame 27 so as to be rotatable about the rotation axis extending in the first direction. As illustrated in FIG. 4, each drum input coupling 54 for transmitting a driving force to the corresponding photosensitive drum 4 is provided on the drive side of the photosensitive drum 4. Each drum input coupling 54 is configured to engage with a corresponding drum drive coupling 52 (FIG. 3B) of the apparatus body 2 so as to receive the driving force from the apparatus body 2 and transmit the driving force to the corresponding photosensitive drum 4. The charging device 5 is provided along the first direction and is supported on the drum frame 27 in proximity to the photosensitive drum 4. The charging device 5 is electrically connected with the apparatus body 2.

The developing cartridge 8 includes the developing frame 28 that stores developer, the developing roller 6, the supply roller 26 that supplies developer to the developing roller 6, and the layer thickness regulating blade 72 that regulates the thickness of developer carried on the surface of the developing roller 6 as described above. As illustrated in FIG. 6, the developing cartridge 8 includes fixing screws 99, an agitation member 88, a drive side bearing member 70, a side cover 68, and a non-drive-side bearing member 71. The developing cartridge 8 further includes a developing gear 61 for driving each member of the developing cartridge 8, a supply gear 63, a developing input gear 62, an agitation gear 65, and an idler gear 64. These components will be described in detail below.

The developing roller 6 is a roller rotatable in the direction indicated by the arrow E as illustrated in FIG. 5 about the rotation axis extending in the first direction. The developing roller 6 is formed of a roller body and a roller shaft. Materials for the roller body include elastic rubber, and a sponge member. Materials for the roller shaft include conductive metal, and resin. The developing gear 61 is coupled to a drive-side end portion of the roller shaft. The supply roller 26 contacts the developing roller 6 to supply developer onto the surface of the developing roller 6. The supply roller 26 is rotatable about the rotation axis extending in the first direction. The supply roller 26 is formed of a roller body and a roller shaft. Materials for the roller body include elastic rubber, and a sponge member. Materials for the roller shaft include conductive metal, and resin. The supply gear 63 is coupled to the drive-side end portion of the roller shaft.

The layer thickness regulating blade 72 contacts the developing roller 6 to regulate the thickness of developer carried on the surface of the developing roller 6. The layer thickness regulating blade 72 is formed of a support plate 73 and a blade portion 74, which is formed of a plate-like member. The layer thickness regulating blade 72 is fixed at a position corresponding to a fixing portion W. The configuration of the layer thickness regulating blade 72 will be described in detail below.

The developing frame 28 stores developer therein, and includes blade support surfaces 28*a* and fixing holes 28*b*. Each blade support surface 28*a* is opposed to the support plate 73 of the layer thickness regulating blade 72. Each fixing hole 28*b* is formed on the corresponding blade support surface 28*a*.

The developing frame 28 further includes a positioning rib 28*c* at a position corresponding to a positioning groove 73*d* of the support plate 73 of the layer thickness regulating blade 72. The developing frame 28 rotatably supports the agitation gear 65. The developing frame 28 also rotatably supports one end of the idler gear 64.

Both end portions of each of the developing frame 28 and the layer thickness regulating blade 72 are fixed by fastening the fixing screws 99, which have passed through through-holes 73*c*, into the fixing holes 28*b*, in a state where the blade support surfaces 28*a* and the support plate 73 are brought into contact with each other and the positioning rib 28*c* and the positioning groove 73*d* engage with each other.

Between the developing frame 28 and the layer thickness regulating blade 72, a first seal member 76 is provided in the rotational axis direction (first direction) of the developing roller 6, and second seal members 77 are provided at both end portions in the first direction. The first seal member 76 and the second seal members 77 are members including a flexible member, such as a sponge, and are compressed between the developing frame 28 and the layer thickness regulating blade 72, thereby filling a gap between the developing frame 28 and the layer thickness regulating blade 72 and preventing leakage of developer. A developer sealing configuration of each of the layer thickness regulating blade 72 and the second seal members 77 will be described in detail below.

As illustrated in FIG. 5, the developing frame 28 is also provided with a third seal member 78 in the first direction. The third seal member 78 is a flexible sheet-like member formed of a material, such as polyethylene terephthalate (PET), polyphenylene sulfide (PPS), or polycarbonate (PC). In a direction perpendicular to the first direction, one end of the third seal member 78 is bonded to the developing frame 28, and the other end of the third seal member 78 is configured to contact the developing roller 6. The third seal member 78 is deformed to fill the gap between the developing frame 28 and the developing roller 6, thereby preventing leakage of developer.

In the vicinity of the third seal member 78, an anti-scattering sheet 79 is provided in the first direction. In the direction perpendicular to the first direction, one end of the anti-scattering sheet 79 is bonded to the developing frame 28, and the other end of the anti-scattering sheet 79 extends toward the developing roller 6. The anti-scattering sheet 79 receives developer, which has dropped from a location near the developing roller 6, thereby preventing the developer from being scattered to the outside.

As illustrated in FIG. 5, the agitation member 88 is provided in the developing frame 28. The agitation member 88 is formed of a shaft portion 88*a* and a flexible sheet-like sheet portion 88*b*. The shaft portion 88*a* is rotatable about the rotation axis extending in the first direction. The agitation member 88 agitates the developer stored in the developing frame 28, and conveys the developer toward the supply roller 26. As illustrated in FIG. 6, the agitation gear 65 is coupled to a drive-side end portion of the shaft portion 88*a*. The drive side bearing member 70 is fixed to the developing frame 28 on the drive side. The drive side bearing member 70 rotatably supports the roller shaft of the developing roller 6, the roller shaft of the supply roller 26, and the developing input gear 62. The side cover 68 is fixed to the developing frame 28 on the drive side. The side cover 68 rotatably supports the other end of the idler gear 64. The side cover 68 includes a function for covering and protecting the supply gear 63, the developing input gear 62, the idler gear 64, and the agitation gear 65. The side cover 68 includes a through-hole 68*a* at a position corresponding to the developing input gear 62. A coupling portion 62*a* of the developing input gear 62 is exposed through the through-hole 68*a* after assembly. The non-drive side bearing member 71 is fixed to the developing frame 28 on the non-drive side. The non-drive side bearing member 71 rotatably supports the roller shaft of the developing roller 6 and the roller shaft of the supply roller 26. The developing input gear 62 includes the coupling portion 62*a* that engages with a corresponding developing drive coupling 51 (FIG. 3B) of the apparatus body 2 and receives a driving force. The driving force input to the developing input gear 62 is transmitted to the developing roller 6 through the developing gear 61. The driving force is also transmitted to the supply roller 26 through the supply gear 63. The driving force is also transmitted to the agitation member 88 through the idler gear 64 and the agitation gear 65.

Detailed Configuration of Layer Thickness Regulating Blade

A detailed configuration of the layer thickness regulating blade 72 will be described with reference to FIGS. 1A, 1B, and 6.

Figure 1A:
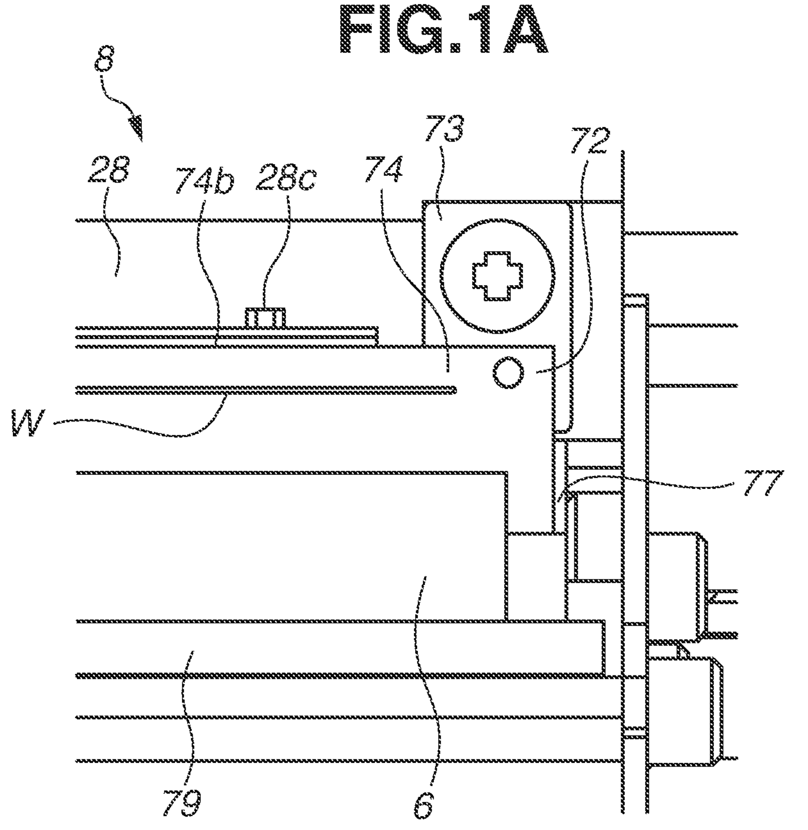
FIGS. 1A and 1B are detailed views each illustrating an assembling portion of a layer thickness regulating blade on a drive side of a developing cartridge according to a first exemplary embodiment.
Figure 1B:
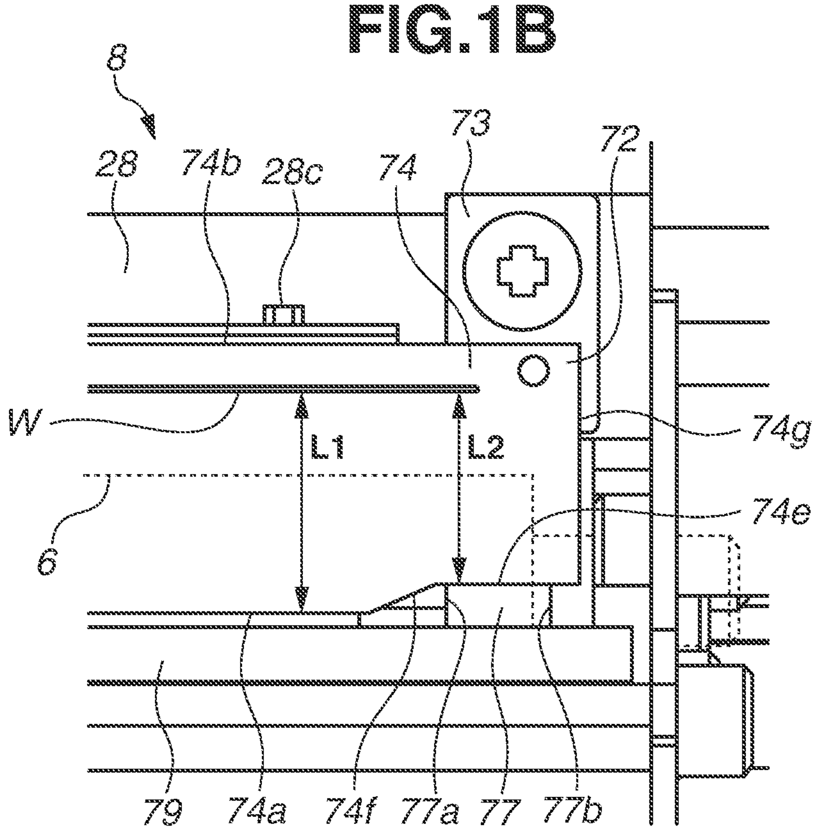

FIGS. 1A and 1B are detailed views each illustrating an assembling portion of the layer thickness regulating blade 72 on the drive side of the developing cartridge 8. FIG. 1A is a detailed view illustrating a state where the developing roller 6 has been assembled. FIG. 1B is a detailed view illustrating a state where the developing roller 6 is represented by a dashed line.

As illustrated in FIGS. 1A, 1B, and 6, the support plate 73 of the layer thickness regulating blade 72 is a metal member that supports the blade portion 74. The support plate 73 includes a first plate-like portion 73*a* and a second plate-like portion 73*b*. The first plate-like portion 73*a* has a substantially rectangular shape opposing to the blade portion 74 and extending in the first direction. The second plate-like portion 73*b* extends from the first plate-like portion 73*a* in a direction crossing the blade portion 74. The first plate-like portion 73*a* includes protruding portions 73*e* at both ends in the first direction. Each protruding portion 73*e* protrudes in a direction apart from the developing roller 6 in the direction perpendicular to the first direction. Each protruding portion 73*e* is provided with the through-hole 73*c* that penetrates through the protruding portion 73*e* in a thickness direction. The second plate-like portion 73*b* is provided with the positioning groove 73*d* having an elongated groove shape. As illustrated in FIGS. 1A, 1B, and 6, the blade portion 74 of the layer thickness regulating blade 72 is a metal member having a substantially rectangular shape extending in the first direction. The blade portion 74 includes a first regulating portion 74*a*, second regulating portions 74*e*, and a proximal end 74*b*. The first regulating portion 74*a* corresponds to one end of the blade portion 74 that contacts the peripheral surface of the developing roller 6 in the direction crossing the first direction. The proximal end 74*b* corresponds to the other end of the blade portion 74 fixed to the first plate-like portion 73*a* of the support plate 73. The thickness of the blade portion 74 is set to a thickness large enough to be elastically deformed when the blade portion 74 contacts the developing roller 6. The blade portion 74 contacts the developing roller 6 with a restoring force generated during elastic deformation. The first regulating portion 74*a* and the second regulating portions 74*e* then regulate the thickness of developer carried on the surface of the developing roller 6. A connecting portion 74*f* connects the first regulating portion 74*a* and the second regulating portions 74*e* to each other. In this case, the connecting portion 74*f* is an inclined straight portion. The first regulating portion 74*a* regulates the layer thickness in a range in which the imaging performance of the electrophotographic image forming apparatus is to be ensured. The second regulating portions 74*e* prevent developer from leaking to the outside of the developing frame 28 from the second seal member 77. Thus, the layer thickness of developer is regulated enough to ensure sealing of developer. The first regulating portion 74*a*, the second regulating portions 74*e*, and the connecting portion 74*f* will be described in detail below.

At both end portions of the blade portion 74 in the first direction, a circular hole 74*c* and a long hole 74*d* are formed. A circular hole 73*f* and a long hole 73*g* are also formed at the corresponding positions on the first plate-like portion 73*a* of the support plate 73. When the blade portion 74 is fixed to the support plate 73, the circular hole 74*c* and the circular hole 73*f* are fixed together and the long hole 74*d* and the long hole 73*g* are fixed together after these holes are positioned to penetrate through the holes with an assembly jig. This leads to an improvement in positioning accuracy of a relative position between the support plate 73 and the blade portion 74. In the first exemplary embodiment, the support plate 73 and the blade portion 74 are each provided with a hole shape. Alternatively, one of the support plate 73 and the blade portion 74 may have a hole shape and the other of the support plate 73 and the blade portion 74 may have a protruding shape, and thereby holes and protruding portions of the support plate 73 and the blade portion 74 may engage with each other to regulate the relative position between the support plate 73 and the blade portion 74.

The first exemplary embodiment uses, as a fixation method for fixing the blade portion 74 to the support plate 73, a laser welding fixation method in which the area of the fixing portion W is small and the fixation strength is high. It may be desirable to set a fixed length (a length of a fixed portion) in the first direction of the fixing portion W that complies with the regulation of the layer thickness by each of the first regulating portion 74*a* and the second regulating portions 74*e*. The fixing portion W and the fixed length will be described in detail below.

Examples of the fixation method other than the laser welding fixation method to be used in the first exemplary embodiment include a fixation method using adhesive or a double-sided adhesive tape.

In a case of using adhesive, like in the first exemplary embodiment, when the position of the end portion (longitudinal end position) in the first direction of the fixing portion W is limited, adverse effects described below may occur. Thus, the fixation method using adhesive is not preferable as the fixation method according to the first exemplary embodiment. When the range of the blade portion 74 is limited such that the range of the first regulating portion 74*a* is fixed and the range of the second regulating portions 74*e* is not fixed, adhesive may spread to the second regulating portions 74*e* during assembly depending on the viscosity of adhesive. Further, it may be desirable to determine the position where adhesive is coated in consideration that adhesive may spread during bonding, and thus nonuniformity of adhesive force may occur. Furthermore, it may be desirable to take time for a drying process during assembly, or it may be desirable to provide an air-conditioning facility to prevent volatile-element compositions from adhesive from adversely affecting other components during the drying process. This leads to a considerable deterioration in functions as compared with the laser welding fixation method.

In a case where a double-sided adhesive tape is adopted as the fixation method, adverse effects to be described below may occur when the position of the longitudinal end of the fixing portion W is limited, like in the first exemplary embodiment. Thus, a double-sided adhesive tape is not preferable as the fixation method according to the first exemplary embodiment. A gap may be formed between the support plate 73 and the blade portion 74 due to a step height generated by a difference in the thickness corresponding to the double-sided adhesive tape, which may cause leakage of developer. To prevent leakage of developer, it may be desirable to provide another sealing configuration. In addition, in the case of attaching a double-sided adhesive tape, a crease portion or a stretching portion may occur on the double-sided adhesive tape. If a crease portion is present, leakage of developer may occur due to a small step, or nonuniformity in regulation pressure on the developing roller 6 may occur, which may lead to nonuniformity in the thickness of the developer layer. This has an adverse effect on images. If a stretching portion is present, adverse effects, such as a decrease in adhesion area, or a decrease in the adhesion strength between the support plate 73 and the blade portion 74, may occur. If nonuniformity in adhesion strength occurs, nonuniformity in regulation pressure on the developing roller 6 occurs, which may cause nonuniformity in the thickness of the developer layer. This may have an adverse effect on images. A double-sided adhesive tape is typically provided with releasing paper, and thus it may require a processing step for removing the releasing paper after the double-sided adhesive tape is peeled off during assembly. It is therefore extremely difficult to adopt the fixation method using a double-sided adhesive tape as the fixation method according to the first exemplary embodiment.

In addition, the cost of adhesive and double-sided adhesive tape is higher than that of the laser welding facility depending on the number of the layer thickness regulating blades 72 to be produced.

For the reasons described above, laser welding is adopted in the first exemplary embodiment so as to achieve a reduction in process time, a reduction in cost, and an improvement in functionality.

Regulation of Developer Layer Thickness by Layer Thickness Regulating Blade

Regulation of the thickness of a developer layer by the layer thickness regulating blade 72 will be described with reference to FIGS. 1A and 1B. A range in which the thickness of a developer layer is regulated by the layer thickness regulating blade 72 is determined by the arrangement of the fixing portion W, the first regulating portion 74*a*, and the second regulating portions 74*e*. The fixing portion W is used for fixing the support plate 73 and the blade portion 74 by welding.

The fixing portion W may be disposed at a position as close to the proximal end 74*b* as possible in the direction crossing the first direction in consideration of the performance of a laser welding apparatus and the accuracy of components of the support plate 73 and the blade portion 74. If the fixing portion W is disposed at a position apart from the proximal end 74*b*, it may be desirable to increase the length of the support plate 73 to be fixed by welding, which leads to an increase in the cost of material and an increase in the size of each of the developing cartridge 8 and the electrophotographic image forming apparatus 1. The end portion position (longitudinal end position) in the first direction of the fixing portion W may be disposed at least on the outside in the longitudinal direction of an end face of a longitudinal inner end 77*a* in the first direction of the second seal member 77. A fixed end of each of the first regulating portion 74*a* and the second regulating portions 74*e* will be described in detail below.

The term "inside" used in the first exemplary embodiment refers to a side closer to the center of each of the developing roller 6 and the layer thickness regulating blade 72 in the rotational axis direction of the developing roller 6. The term "outside" used in the first exemplary embodiment refers to a side farther from the center of each of the developing roller 6 and the layer thickness regulating blade 72 in the rotational axis direction of the developing roller 6. The term "central portion" of the layer thickness regulating blade 72 refers to an image forming region. The term "end portion" of the layer thickness regulating blade 72 refers to a region outside of the image forming region. The terms defined above are used in the same manner in the following description, unless specified otherwise.

The first regulating portion 74*a* is a regulating portion that regulates the layer thickness in a range in which the imaging performance of the electrophotographic image forming apparatus is to be ensured. Specifically, a region including the range in which the imaging performance of the electrophotographic image forming apparatus is to be ensured and at least the outside of the range in the first direction is set as a layer thickness regulation range, and the entire region in the longitudinal direction of the first regulating portion 74*a* is fixed by the fixing portion W. The term "range in which the imaging performance is to be ensured" refers to a longitudinal width of an image forming region to be used for the image forming apparatus 1 to execute image formation. Thus, the layer thickness regulation range of the first regulating portion 74*a* according to the first exemplary embodiment refers to a region covering the image forming region and a region that is slightly outside of the image forming region. The layer thickness regulating range of the first regulating portion 74*a* is not limited to the above-described longitudinal width, and the layer thickness regulating range may include at least the image forming region. For example, the layer thickness region range of the first regulating portion 74*a* may have the same width as that of the image forming region.

As illustrated in FIG. 1B, a distance L1 from the fixing portion W to the first regulating portion 74*a* in the direction crossing the first direction may be determined so as to obtain a set pressure at which the layer thickness is regulated. In general, if the pressure is low, the thickness of developer coat on the developing roller 6 increases. In contrast, if the pressure is high, the thickness of the developer layer decreases. The pressure is determined depending on a desired setting, accordingly.

Each second regulating portion 74*e* regulates the thickness of the developer layer in consideration of sealing properties so as to prevent the developer from leaking to the outside of the developing frame 28 from the second seal member 77. A phenomenon that occurs when developer leaks to the outside of the developing frame 28 will now be described. A part of the developer, the layer thickness of which is regulated, cannot be regulated in a range from the first regulating portion 74*a* to the connecting portion 74*f* and the second regulating portions 74*e*, so that the developer runs transversely along an edge ridge of the blade portion 74 that corresponds to a distal end of the first regulating portion 74*a*. In other words, a phenomenon in which developer moves along edges of the first regulating portion 74*a* of the blade portion 74 in the first direction occurs. The transversely running developer then reaches the longitudinal inner end 77*a* of the second seal member 77, and enters the second seal member 77. The developer is then constantly pushed into the second seal member 77, which leads to leakage of developer through a longitudinal outside end 77*b*. It may be desirable to set the arrangement and the regulation pressure of the second regulating portions 74*e* in consideration of this phenomenon.

As for the arrangement of the second regulating portions 74*e*, a distance L2 from the fixing portion W to each second regulating portion 74*e* is set to be shorter than the distance L1 from the fixing portion W to the first regulating portion 74*a* in the direction crossing the first direction. As a result, the regulation pressure of each second regulating portion 74*e* on the developing roller 6 is set to be higher than the regulation pressure of the first regulating portion 74*a* at the distance L1. In other words, the thickness of the developer layer to be regulated by each second regulating portion 74*e* is smaller than the thickness of the developer layer to be regulated by the first regulating portion 74*a*. Specifically, each second regulating portion 74*e* is more recessed toward the proximal end 74*b* from the end portion at the distal end of the regulating blade 72 than the first regulating portion 74*a*. In the following description, the length of the first regulating portion 74*a* and the length of each second regulating portion 74*e* are compared. However, only the distance (recessed amount) of the recessed portion from the end portion at the distal end is changed. It is thus assumed that the recessed amount of each second regulating portion 74*e* having a recessed shape at the distal end portion of the first regulating portion 74*a* is quantified.

The connecting portion 74*f* is a regulating portion that smoothly connects the first regulating portion 74*a* and the second regulating portions 74*e* with an oblique straight line shape. The regulation pressure of the first regulating portion 74*a* and the regulation pressure of the second regulating portion 74*e* are different. When the regulation pressure is rapidly changed, the thickness of the developer layer on the developing roller 6 is also rapidly changed in the longitudinal direction, accordingly. The layer thickness at the end portion in the longitudinal direction of the first regulating portion 74*a* that regulates the layer thickness in the range in which the imaging performance is to be ensured can thereby be changed to a larger extent than the central portion. The change in the layer thickness may thus have an adverse effect on the image formation, and therefore it may be desirable to suppress a change in the layer thickness as much as possible so as to prevent a rapid change in the layer thickness. During image formation, the blade portion 74 is continuously rubbed on the surface of the developing roller 6 via the developer along with the rotation of the developing roller 6. In this case, in a configuration in which a rapid change in the layer thickness between the first regulating portion 74*a* and the second regulating portions 74*e* occurs, the distal end portion of the blade portion 74 may damage the surface of the developing roller 6. It may be thus desirable to connect the first regulating portion 74*a* and the second regulating portion 74*e* with a smooth shape, such as an oblique line. How to connect the first regulating portion 74*a* and the second regulating portion 74*e* is therefore not particularly limited as long as a rapid change in the layer thickness between the first regulating portion 74*a* and the second regulating portion 74*e* does not occur in the configuration. For example, the first exemplary embodiment illustrates an example where an oblique straight line shape is used to smoothly connect the first regulating portion 74*a* and the second regulating portion 74*e*. Alternatively, any shape, such as a curved shape, may be used as long as the above-described adverse effects can be prevented.

In the first exemplary embodiment, as illustrated in FIG. 1B, the blade portion 74 is disposed such that an end face at an inner end in the longitudinal direction of the second regulating portion 74*e* is disposed on the outside in the longitudinal direction of an end face of the first regulating portion 74*a* and on the inside in the longitudinal direction of an end face of the longitudinal outside end 77*b* of the second seal member 77 in the first direction. Thus, the sealing pressure for sealing developer can be set at least on the second seal member 77. In the first exemplary embodiment, as illustrated in FIG. 1B, the end face at the inner end in the longitudinal direction of the second regulating portion 74*e* is disposed on the inside of the end face of the longitudinal inner end 77*a* of the second seal member 77. Thus, a desired sealing pressure can be obtained from the longitudinal inner end 77*a* of the second seal member 77, which is a path through which developer enters the second seal member 77.

In the first exemplary embodiment, the fixed end of the fixing portion W is located on the outside in the longitudinal direction of the longitudinal inner end 77*a* of the second seal member 77 and on the inside in the longitudinal direction of the longitudinal outside end 77*b*. The effect of the longitudinal positional relationship between the fixed end of the fixing portion W and the second seal member 77 will be described below.

Figure 7A:
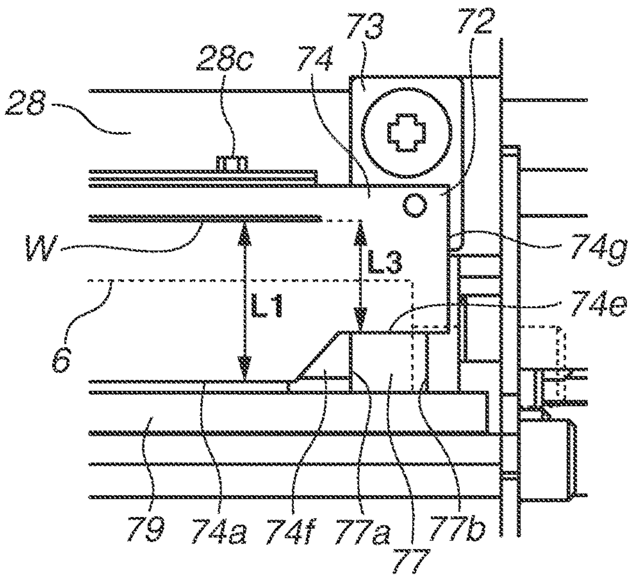
FIGS. 7A, 7B, and 7C are diagrams each illustrating a fixing portion of a layer thickness regulating blade according to the first exemplary embodiment.
Figure 7B:
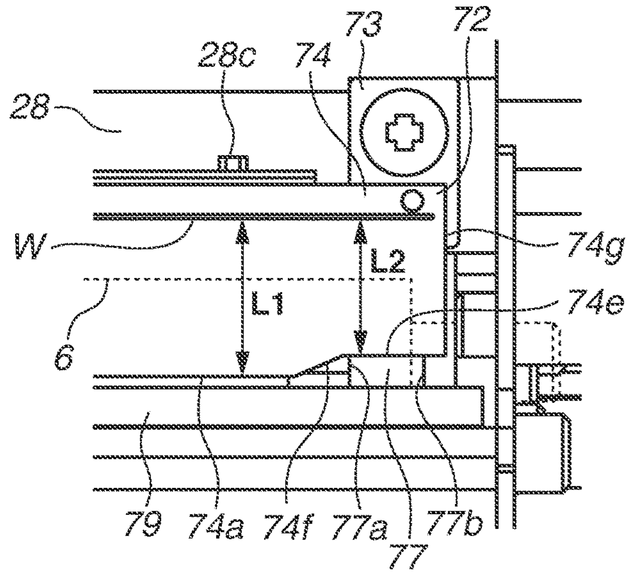
Figure 7C:
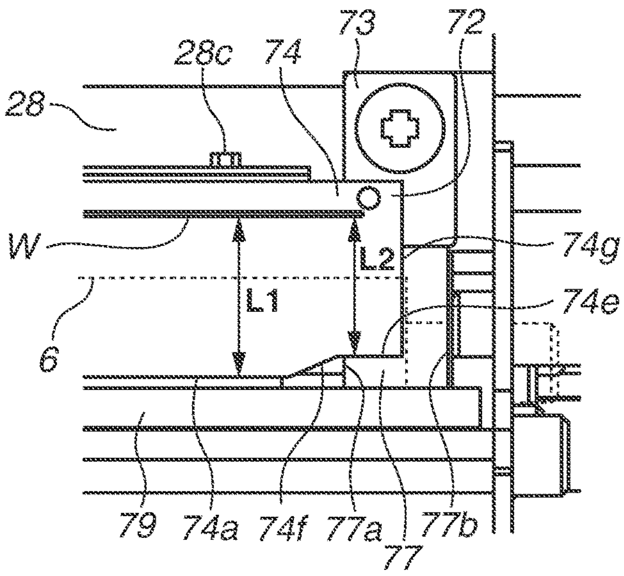

FIGS. 7A to 7C are diagrams each illustrating the fixing portion W of the layer thickness regulating blade 72. FIG. 7A is a diagram illustrating that the fixed end of the fixing portion W is located on the inside in the longitudinal direction of the longitudinal inner end 77*a* of the second seal member 77. FIG. 7B is a diagram illustrating that the fixed end of the fixing portion W is located on the outside in the longitudinal direction of the longitudinal outside end 77*b* of the second seal member 77. FIG. 7C is a diagram illustrating a state where the longitudinal outside end 77*b* of the second seal member 77 is disposed on the outside in the longitudinal direction of a longitudinal end portion 74*g* of the blade portion 74.

As illustrated in FIG. 7A, if the fixed end of the fixing portion W is disposed on the inside in the longitudinal direction of the longitudinal inner end 77*a*, a non-fixed portion of the blade portion 74 is deformed toward the inside in the longitudinal direction, and thus the portion is less affected by a repulsion from the second seal member 77. The sealing pressure of the longitudinal inner end 77*a* of the second seal member 77 is decreased, accordingly. To set the sealing pressure to prevent leakage of developer, the fixation distance from the fixing portion W is thus set as a distance L3 instead of the distance L2 illustrated in FIG. 1B. The distance L3 illustrated in FIG. 7A is shorter than the distance L2. The sealing pressure equivalent to that at the distance L2 described above can thereby be obtained. As described above, developer that runs transversely along the end ridge of the blade portion 74 corresponding to the distal end of each of the first regulating portion 74*a* and the second regulating portions 74*e* is sealed on the second seal member 77, accordingly. It is therefore possible to prevent leakage of developer to the outside of the developing frame 28.

As described above, if the longitudinal distance between the longitudinal inner end 77*a* of the second seal member 77 and the fixed end of the fixing portion W is large, a gap occurs between the longitudinal inner end 77*a* of the second seal member 77 and the fixed end of the fixing portion W due to deformation of the blade portion 74, which may cause leakage of developer. Thus, as illustrated in FIG. 1B, it may be desirable to place the end portion position (longitudinal end position) in the first direction of the fixing portion W at least on the outside in the longitudinal direction of the longitudinal inner end 77*a* in the first direction of the second seal member 77.

As illustrated in FIG. 7B, if the fixed end of the fixing portion W is disposed on the outside in the longitudinal direction of the longitudinal outside end 77*b*, the layer thickness regulation pressure of the second regulating portions 74*e* can be increased and thus the sealing pressure for preventing leakage of developer in the entire region in the longitudinal direction of the second seal member 77 can be obtained. Thus, even if developer runs transversely along the edge ridge of the blade portion 74 corresponding to the distal end of each of the first regulating portion 74*a* and the second regulating portion 74*e*, the developer can be sealed on the second seal member 77 and leakage of the developer to the outside of the developing frame 28 can be prevented. The configuration illustrated in FIG. 7B is a configuration in which leakage of developer from the longitudinal outside end 77*b* of the second seal member 77 can be prevented. However, only a small amount of developer may spread from the longitudinal inner end 77*a* of the second seal member 77 depending on the surface accuracy of components of the blade portion 74 and the bonding position accuracy and the surface state of the second seal member 77. In this case, the sealing pressure of the second seal member 77 is high, and thus further leakage of developer can be prevented and spreading of developer can be stopped on the second seal member 77. At this time, the spreading developer is sandwiched and rubbed between the blade portion 74, the second seal member 77, and the developing roller 6 in a state where the sealing pressure is high, and thereby the temperature of developer increases to a point above the melting point of the developer and the developer is fused on the blade portion 74 and the second seal member 77. If the developer is fused on the blade portion 74 and the second seal member 77, the fused developer is swollen, so that a gap may occur from a state where the blade portion 74, the second seal member 77, and the developing roller 6 are brought into contact with each other to seal the developer. This may then cause the developer leaking from the gap, resulting in leakage of developer. As illustrated in FIG. 1B, it may therefore be desirable to place the end portion position (longitudinal end position) in the first direction of the fixing portion W at least on the inside in the longitudinal direction of the longitudinal outside end 77*b* in the first direction of the second seal member 77. Thus, the regulation pressure of the second regulating portions 74*e* is not increased in the entire region in the longitudinal direction of the second seal member 77 and decreased toward the longitudinal outside end 77*b*. The risk at which developer spreading on the second seal member 77 described above is fused can be reduced, accordingly.

As illustrated in FIG. 7C, the longitudinal outside end 77*b* of the second seal member 77 is disposed on the outside in the longitudinal direction of the longitudinal end portion 74*g* of the blade portion 74, thereby preventing the developer that has entered the second seal member 77 from spreading beyond the longitudinal end portion 74*g* of the blade portion 74. As described above, even if developer runs transversely along the edge ridge of the blade portion 74 corresponding to the distal end of each of the first regulating portion 74*a* and the second regulating portion 74*e*, the developer is thus sealed on the second seal member 77. This can thereby prevent the developer from leaking to the outside of the developing frame 28. As described above, the risk at which developer may be fused on the blade portion 74 and the second seal member 77 can also be reduced. It may therefore be desirable to determine the end portion position (longitudinal end position) in the first direction of the fixing portion W on the outside in the longitudinal direction of the longitudinal inner end 77*a* in the first direction of the second seal member 77 and on the inside in the longitudinal direction of the longitudinal end portion 74*g* of the blade portion 74.

In the case of fixing the layer thickness regulating blade 72 by welding in the configuration according to the first exemplary embodiment, it is therefore possible to reduce leakage of developer from the developing frame 28, while maintaining a uniform thickness of the developer layer in the developer coat region on the developing roller 6. To achieve this, the developing cartridge 8 serving as the developing device according to the first exemplary embodiment has the following configuration.

The developing cartridge 8 used for the image forming apparatus 1 includes the developing frame 28 that stores developer, the rotatable developing roller 6 that carries the developer, and the layer thickness regulating blade 72 fixed to the developing frame 28. The layer thickness regulating blade 72 regulates the thickness of developer carried on the surface of the developing roller 6. The developing cartridge 8 further includes the second seal member 77 that seals the developer so as to prevent the developer from leaking to the outside of the developing frame 28. The layer thickness regulating blade 72 includes the support plate 73 extending in the rotational axis direction of the developing roller 6, and the blade portion 74 serving as a plate-like member. The blade portion 74 is disposed to be opposed to the developing roller 6 at one end portion corresponding to each of the regulating portions 74*a* and 74*e* (the distal end portions) in the direction crossing the rotational axis direction. The blade portion 74 is supported on the support plate 73 at the other end portion corresponding to the proximal end 74*b* in the direction crossing the rotational axis direction.

The blade portion 74 is provided with the first and second regulating portions 74*a* and 74*e* that regulate the thickness of developer carried on the surface of the developing roller 6. The first and second regulating portions 74*a* and 74*e* contact the developing roller 6 on an opposed surface of the blade portion 74 at one end portion of the blade portion 74. The first and second regulating portions 74*a* and 74*e* are formed of the first regulating portion 74*a* and the second regulating portions 74*e*. The second regulating portion 74*e* is disposed on a side that is adjacent to the first regulating portion 74*a* in the rotational axis direction and is farther from the center in the rotational axis direction than the first regulating portion 74*a*. The second regulating portion 74*e* is recessed toward the proximal end 74*b* of the blade portion 74 in the direction crossing the rotational axis direction. The second regulating portion 74*e* is lower than the distal end of the first regulating portion 74*a*.

The blade portion 74 is welded to the support plate 73 at the position where the first regulating portion 74*a* is formed and at the position where each second regulating portion 74*e* is formed in the rotational axis direction. The blade portion 74 is continuously welded to the support plate 73 in a range from the position, which is located on the other end portion in the direction crossing the rotational axis direction and at which the first regulating portion 74*a* is formed in the rotational axis direction, to the position where each second regulating portion 74*e* is formed. In other words, a welding trace serving as the fixing portion W is continuously formed along the rotational axis direction.

As a preferred configuration, the following configuration can be used. In a state where the blade portion 74 and the second seal member 77 contact in the direction crossing the rotational axis direction, the following configuration can be set at the position of the blade portion 74 where the blade portion 74 and the second seal member 77 contact in the rotational axis direction. The welding trace serving as the fixing portion W formed on the blade portion 74 welded to the support plate 73 is continuously formed from the position where the first regulating portion 74*a* is formed in the rotational axis direction. In the rotational axis direction, a welded portion in which the welding trace serving as the fixing portion W is continuously formed from the position where the first regulating portion 74*a* is formed and a non-welded portion except the fixing portion W are formed.

The non-welded portion is not formed on the support plate 73. In the rotational axis direction, the welded portion formed on the blade portion 74 is located on a side closer to the center of the blade portion 74 in the rotational axis direction than the non-welded portion except the fixing portion W. Setting of the configuration described above makes it possible to reduce the risk at which developer spreading on the second seal member 77 may be fused.

Shape of Connecting Portion of Layer Thickness Regulating Blade

Figure 8A:
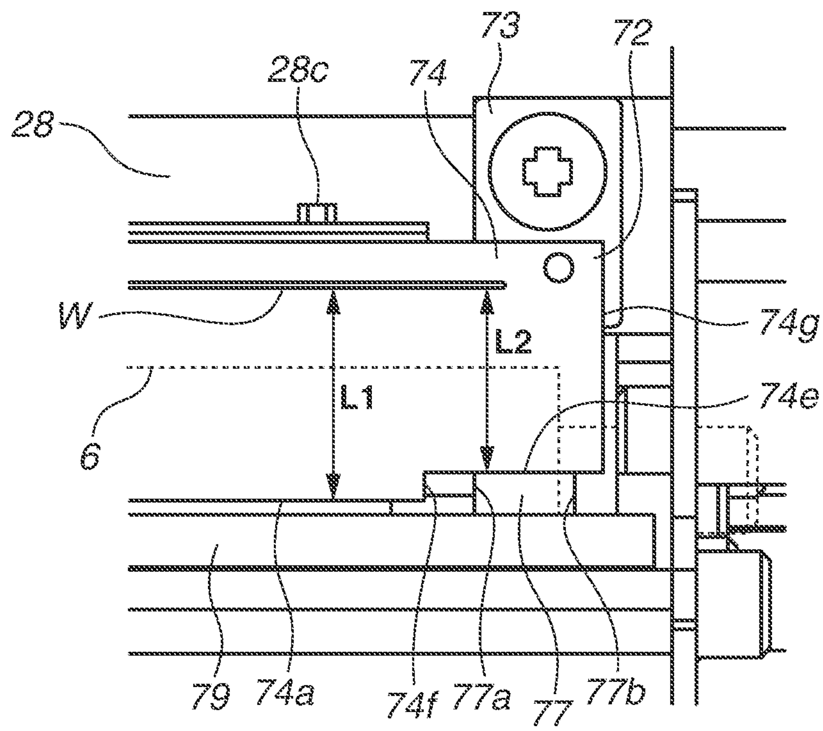
FIGS. 8A and 8B are diagrams each illustrating the fixing portion of the layer thickness regulating blade according to the first exemplary embodiment.
Figure 8B:
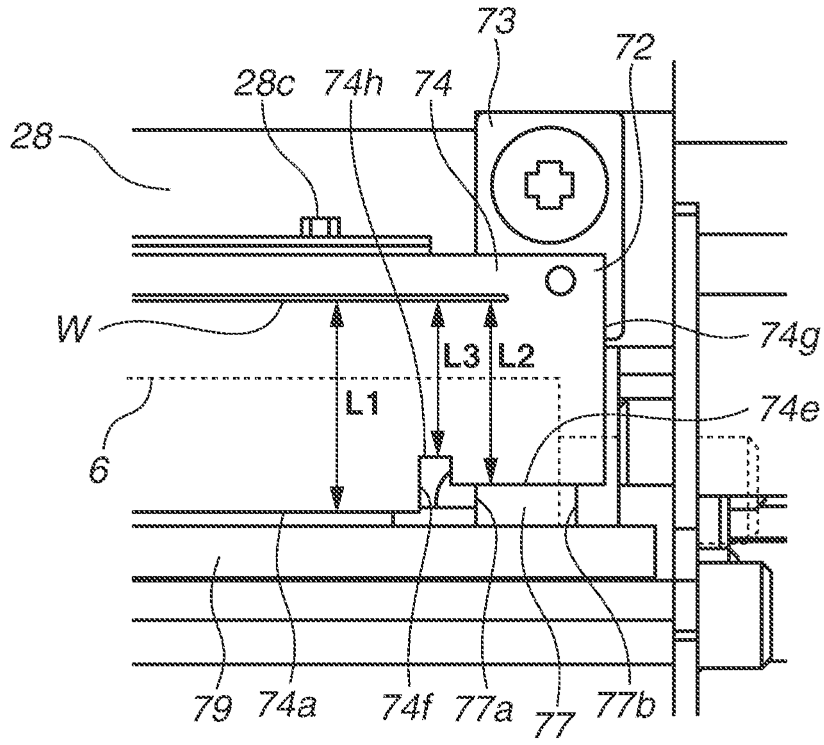

A detailed shape of the connecting portion 74*f* of the layer thickness regulating blade 72 will be described with reference to FIGS. 1A, 1B, 8A, and 8B. FIGS. 8A and 8B are diagrams each illustrating the connecting portion 74*f* of the layer thickness regulating blade 72. As described above, in regulation of the thickness of a developer layer using the layer thickness regulating blade 72, the shape in which the first regulating portion 74*a* and the second regulating portions 74*e* are connected is an oblique straight line shape, such as the connecting portion 74*f* illustrated in FIG. 1B. However, as illustrated in FIGS. 8A and 8B, the shape of the connecting portion 74*f* is not limited to the shape illustrated in FIG. 1B.

As illustrated in FIG. 8A, the connecting portion 74*f* is set in the direction crossing the first direction, that is, in the direction perpendicular to the fixing portion W. Setting of the connecting portion 74*f* as described above makes it possible to reduce an increase in the size of the developing cartridge 8 in the longitudinal direction. For example, the space between the first regulating portion 74*a* and each second regulating portion 74*e* may be formed in a step shape or a circular arc shape so that the distance between the fixing portion W and the distal end of the blade portion 74 gradually decreases.

As illustrated in FIG. 8B, a third regulating portion 74*h* is provided between the first regulating portion 74*a* and the second regulating portion 74*e*. The distance between the third regulating portion 74*h* and the fixing portion W is set to a distance L3 that is shorter than the distance L2. This makes the regulation pressure for regulating the thickness of the developer layer by the third regulating portion 74*h* become higher than the regulation pressure of the second regulating portion 74*e* that contributes to the prevention of leakage of developer. The thickness of the developer layer on the developing roller 6 is thus smaller than that of the second regulating portion 74*e*, which leads to a reduction in the amount of developer to be inserted into the second regulating portion 74*e*. The risk at which the developer may be fused on the second seal member 77 can be reduced, accordingly. As illustrated in FIG. 8B, the distance between the fixing portion W and the distal end of the third regulating portion 74*h* is set to the distance L3 and is defined as the distance similar to that illustrated in FIG. 7A. However, the distance between the fixing portion W and the distal end of the third regulating portion 74*h* is not limited to the distance L3, as long as the distance is shorter than the distance L2. However, as described above, it may be desirable to set the distance so as to prevent occurrence of a rapid change in the layer thickness in the longitudinal direction of the developing roller 6.

In the configuration of the image forming apparatus 1 according to a second exemplary embodiment, components of the second exemplary embodiment that are the same as those of the first exemplary embodiment are denoted by the same reference numerals and the descriptions thereof are omitted.

Figure 9:
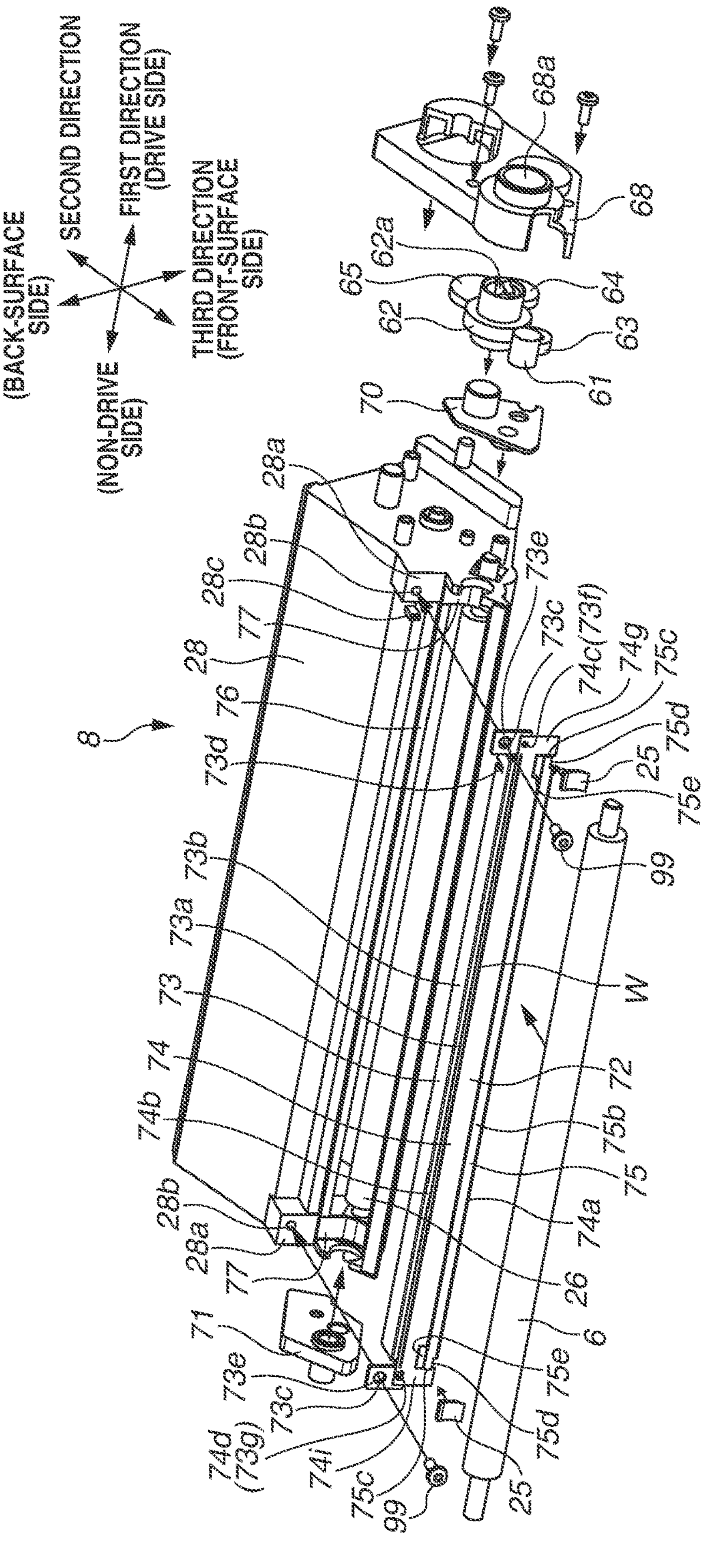
FIG. 9 is an exploded perspective view of a developing cartridge according to a second exemplary embodiment.
Figure 10:
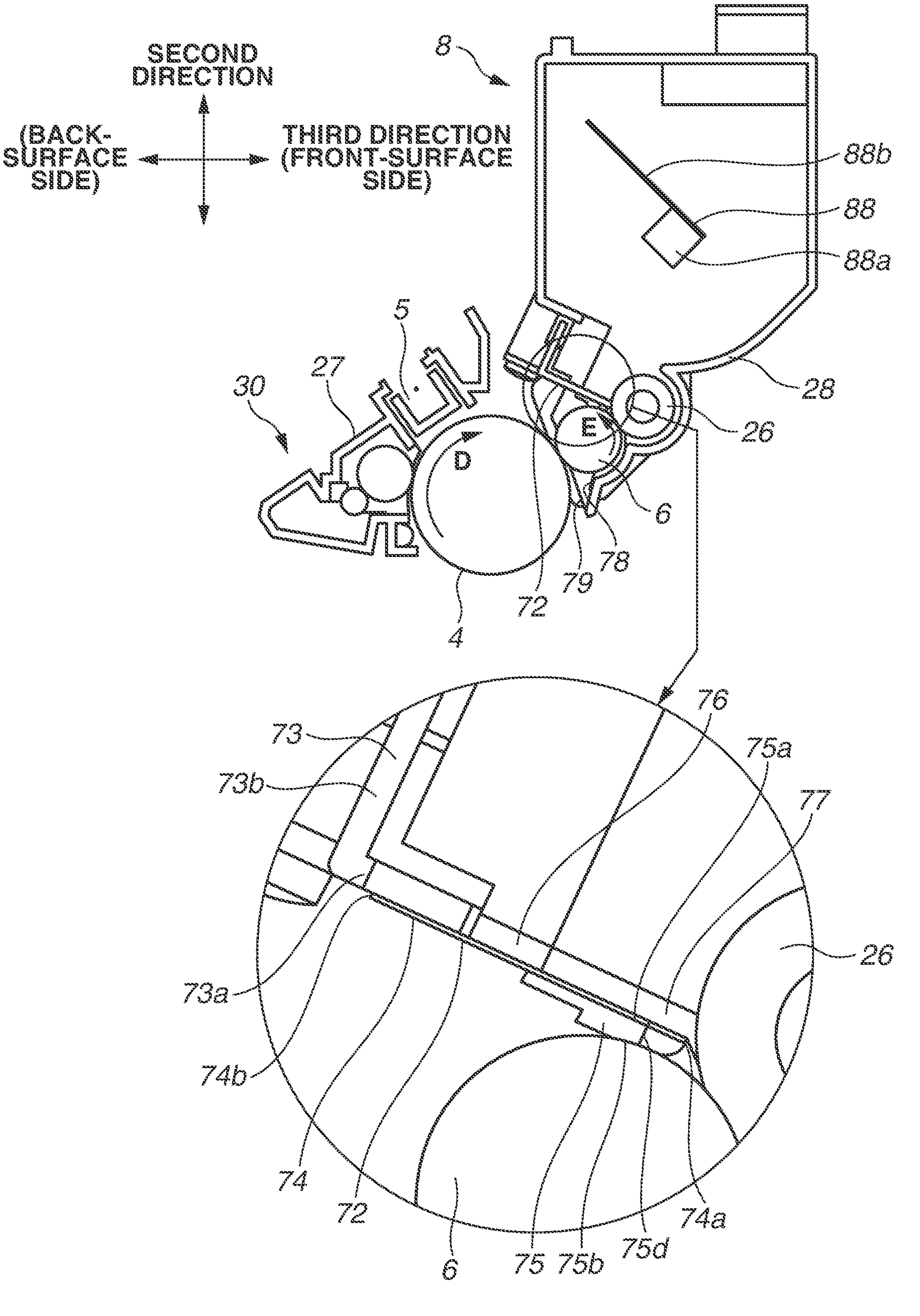
FIG. 10 is a sectional view illustrating the developing cartridge and a drum unit according to the second exemplary embodiment.

In the configuration according to the second exemplary embodiment, a regulating member 75 is provided as a separate member at a distal end portion at one end portion of the regulating blade 72. The distal end portion is mainly formed of the first regulating portion 74*a* according to the first exemplary embodiment, and the distal end portion may also include the second regulating portion 74*e*. The configuration of the regulating blade 72 according to the second exemplary embodiment will be described with reference to FIGS. 9 and 10. FIG. 9 is an exploded perspective view of the developing cartridge 8 according to the second exemplary embodiment. In FIG. 9, a direction in which each component is mounted is indicated by an arrow. FIG. 10 is a sectional view illustrating the developing cartridge 8 and the drum unit 30 according to the second exemplary embodiment.

The regulating blade 72 contacts the developing roller 6 to regulate the thickness of developer carried on the surface of the developing roller 6. As illustrated in FIG. 9, the regulating blade 72 according to the second exemplary embodiment includes the support plate 73, the blade portion 74, and the regulating member 75.

The regulating member 75 has a substantially rectangular shape extending in the first direction and is formed on the inside of the longitudinal end portion 74*g* of the blade portion 74 in the first direction. The regulating member 75 is a flexible member formed of a rubber member, such as silicon rubber or urethane rubber, or resin material. The regulating member 75 includes a first surface 75*a* (FIG. 10) and a second surface 75*b*. The first surface 75*a* is opposed to the blade portion 74 and is fixed to the distal end portion. The second surface 75*b* serves as a regulating portion opposed to the developing roller 6 and contacts the surface of the developing roller 6. A corner portion at the distal end of the regulating blade 72 on the second surface 75*b* has a circular arc sectional shape as viewed along the first direction (FIG. 10). The regulating member 75 includes notch portions 75*d* serving as recessed portions at both end portions in the first direction. Each notch portion 75*d* has a shape that is recessed toward the proximal end 74*b* from the end portion at the distal end of the regulating blade 72 and is recessed toward the inside in the first direction from a corresponding one of end portions 75*c* provided at both ends in the first direction of the regulating member 75. A portion where each notch portion 75*d* is formed in the corner portion at the distal end of the regulating blade 72 of the regulating member 75 has a substantially rectangular sectional shape as viewed along the first direction. The developing roller 6 rotates in the direction indicated by the arrow E, while being rubbed on the surface of the regulating member 75 (FIG. 10). In the portion where each notch portion 75*d* is formed in the corner portion at the distal end of the regulating blade 72 of the regulating member 75, developer on the surface of the developing roller 6 can thereby be more easily scraped off than in a section where the notch portion 75*d* is not formed on the inside in the first direction. Specifically, as illustrated in FIG. 10, in the section where the notch portion 75*d* is not formed, a contact width between the developing roller 6 and the regulating member 75 in the rotational direction of the developing roller 6 is large. In contrast, the contact width in the section where the notch portion 75*d* is formed is small, and thus the contact pressure is high, which makes it easier to scrape off the developer on the surface of the developing roller 6. In the section where the notch portion 75*d* is not formed, the corner portion at the distal end of the regulating member 75 has a circular arc shape, which makes it easier to guide the developer toward the surface of the developing roller 6. In contrast, in the section where the notch portion 75*d* is formed, the corner portion at the distal end of the regulating member 75 has a substantially rectangular shape, which makes it difficult to guide the developer toward the surface of the developing roller 6 and thus makes it easier to scrape off the developer.

At both end portions in the first direction of the regulating member 75, protruding portions 75*e* that protrude from the other section in the direction apart from the developing roller 6 in the direction perpendicular to the first direction are formed. Each protruding portion 75*e* is formed with a thickness smaller than that of the other section of the regulating member 75, and is located closer to the blade portion 74 than the second surface 75*b*. The distal end portion of the blade portion 74 has a shape corresponding to the regulating member 75 and the notch portion 75*d*.

The developing frame 28 stores developer therein and includes the blade support surfaces 28*a* and the fixing holes 28*b*. Each blade support surface 28*a* is opposed to the support plate 73 of the regulating blade 72. Each fixing hole 28*b* is provided on the blade support surface 28*a*. The developing frame 28 further includes the positioning rib 28*c* at the position corresponding to the positioning groove 73*d* of the support plate 73 of the regulating blade 72. The developing frame 28 rotatably supports the agitation gear 65 and rotatably supports one end of the idler gear 64. Both end portions of each of the developing frame 28 and the regulating blade 72 are fixed by fastening the fixing screws 99, which have passed through through-holes 73*c* into the fixing holes 28*b* in the state where the blade support surfaces 28*a* and the support plate 73 are brought into contact with each other and the positioning rib 28*c* and the positioning groove 73*d* engage with each other.

Figure 11A:
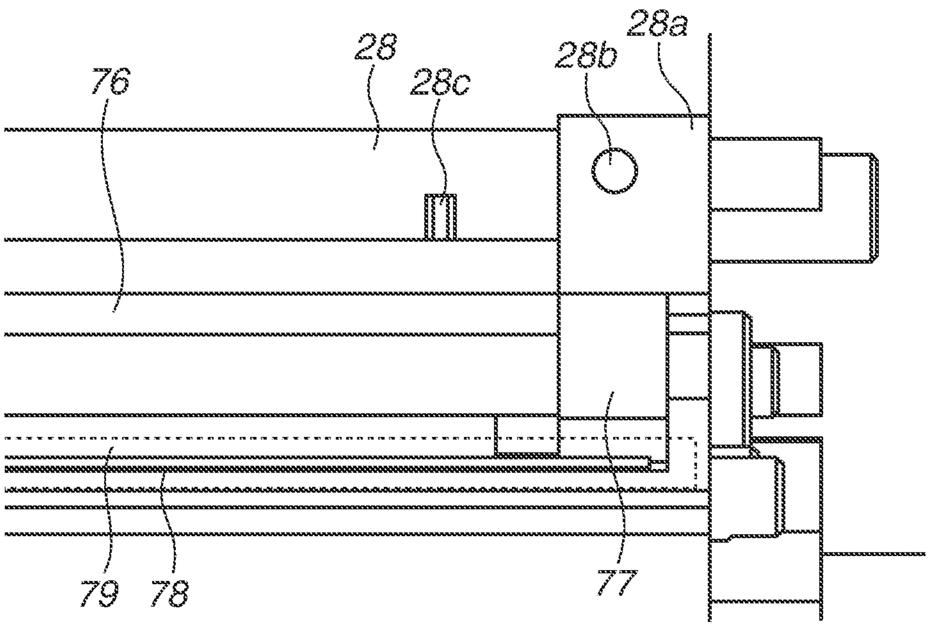
FIGS. 11A and 11B are diagrams each illustrating the developing cartridge according to the second exemplary embodiment.
Figure 11B:
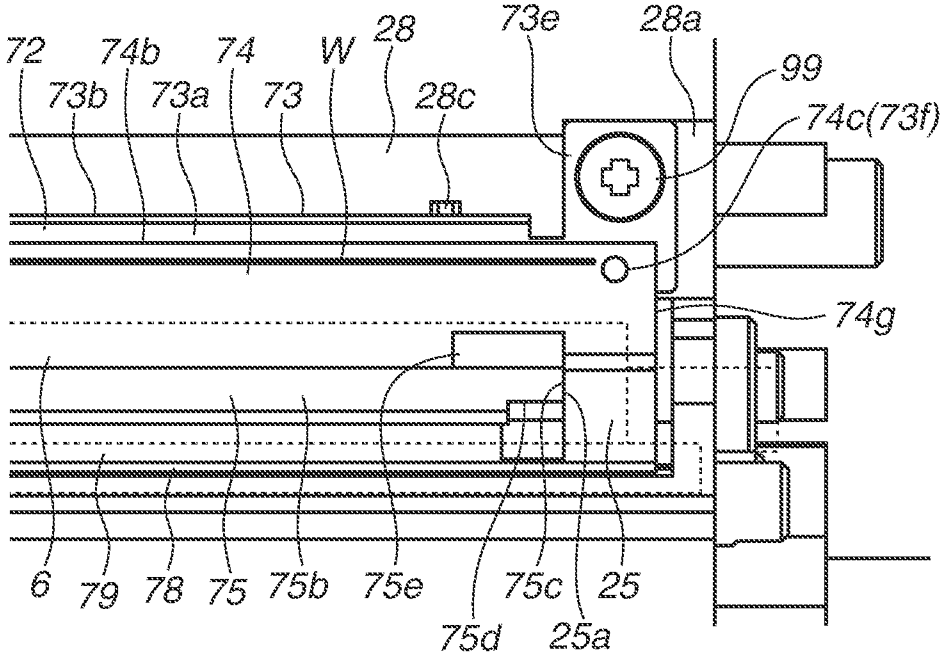

The developer sealing configuration of the developing cartridge 8 according to the second exemplary embodiment will now be described with reference to FIGS. 11A and 11B. FIG. 11A illustrates the developing cartridge 8 in a state where the illustration of each of the developing roller 6 and the regulating blade 72 is omitted and the anti-scattering sheet 79 is indicated by a dashed line. FIG. 11B illustrates the developing cartridge 8 in a state where the developing roller 6 and the anti-scattering sheet 79 are each indicated by a dashed line. In the following description, the configuration on the drive side will be described by way of example. The configuration on the drive side is similar to the configuration on the non-drive side.

As illustrated in FIG. 11A, the first seal member 76 is provided in the rotational axis direction of the developing roller 6 between the regulating blade 72 and the developing frame 28. The second seal members 77 are provided between the developing frame 28 and the both end portions in the first direction of the regulating blade 72. The first seal member 76 and the second seal members 77 are members including a flexible member, such as a sponge, and are compressed between the developing frame 28 and the regulating blade 72, thereby filling a gap between the developing frame 28 and the regulating blade 72 and preventing leakage of developer.

As illustrated in FIG. 11B, end portion seal members 25 each serving as a seal member that contacts the corresponding end portion 75*c*, which is an end face of the regulating member 75, are fixed to the longitudinal end portion 74*g* of the blade portion 74. In this case, each end portion 75*c* is a section that is located on the outermost side in the first direction of the second surface 75*b* that contacts the developing roller 6. In other words, the end portion 75*c* is a section that is located on the outermost side in the first direction and is in contact (close contact) with the end portion 25*a*, which is an end face on the inside of the end portion seal member 25. At least a part of the end portion seal member 25 protrudes toward the distal end portion from the longitudinal end portion 74*g* of the blade portion 74, and is fixed to the surface of the second seal member 77 opposed to the developing roller 6. The end portion seal member 25 is disposed between the blade portion 74 and the developing roller 6 in the thickness direction of the blade portion 74. The thickness direction crosses the first direction.

Each end portion seal member 25 is a member including a flexible member, such as a sponge, and is disposed and compressed between the blade portion 74 and the developing roller 6, thereby preventing leakage of developer from the gap between the end portion seal member 25 and the regulating member 75. At the both end portions of the developing roller 6 in the first direction, the second seal member 77 and the end portion seal member 25 are compressed, thereby filling the gap between the developing frame 28, the regulating blade 72, and the developing roller 6 and preventing leakage of developer.

In the configuration according to the second exemplary embodiment, in a case where the layer thickness regulating blade 72 is fixed by welding, it is possible to reduce the amount of developer to be inserted into the second seal member 77, while maintaining a uniform thickness of the developer layer in the developer coat region on the developing roller 6. To achieve this, the developing cartridge 8 serving as the developing device according to the second exemplary embodiment has the following configuration.

The developing cartridge 8 used for the image forming apparatus 1 includes the developing frame 28 that stores developer, the rotatable developing roller 6 that carries developer, and the layer thickness regulating blade 72. The layer thickness regulating blade 72 regulates the thickness of developer carried on the surface of the developing roller 6. The developing cartridge 8 further includes the second seal members 77 that seal developer so as to prevent the developer from leaking to the outside of the developing frame 28.

The layer thickness regulating blade 72 includes the support plate 73 extending in the rotational axis direction of the developing roller 6. The layer thickness regulating blade 72 further includes the blade portion 74 serving as a plate-like member that is disposed at one end portion in the direction crossing the rotational axis direction so as to be opposed to the developing roller 6 and is supported on the support plate 73 at the other end portion in the direction crossing the rotational axis direction. The layer thickness regulating blade 72 further includes the regulating member 75 that regulates the thickness of developer carried on the surface of the developing roller 6.

The regulating member 75 is fixed to the opposed surface of the blade portion 74 that is opposed to the developing roller 6 at one end portion and contacts the developing roller 6. The regulating member 75 is formed on the inside of the longitudinal end portion 74*g* of the blade portion 74 in the rotational axis direction. Further, the regulating member 75 constitutes the second surface 75*b* (a regulation portion) that regulates the thickness of developer carried on the surface of the developing roller 6. The regulating member 75 also constitutes the notch portions 75*d* each serving as a recessed portion disposed on a side farther from the center in the rotational axis direction of the developing roller 6 than the second surface 75*b* in the rotational axis direction. Each notch portion 75*d* is recessed toward the other end portion of the blade portion 74 in the direction crossing the rotational axis direction, and the notch portion 75*d* is lower than the distal end of the second surface 75*b*.

The region of the blade portion 74 where a welding trace is formed on the blade portion 74 welded to the support plate 73 is located at the other end portion in the direction crossing the rotational axis direction, and overlaps the central portion of the regulating member 75 in the rotational axis direction and the end portion at which the recessed portion is formed.

The second seal member 77 is disposed at an end portion of the developing roller 6 in the rotational axis direction, is fixed to the developing frame 28, and is disposed on the outside of the notch portion 75*d*. The second seal member 77 is also disposed between the developing frame 28 and the developing roller 6 in the direction crossing the rotational axis direction. The end face of the blade portion 74 is located on a side farther from the center than an end face on a side father from the center of the second seal member 77 in the rotational axis direction of the developing roller 6. In a state where one end portion of the blade portion 74 and the second seal member 77 contact, the following configuration is set in a region that overlaps the position of the blade portion 74 where the blade portion 74 and the second seal member 77 contact in the rotational axis direction. The welding trace formed on the blade portion 74 welded to the support plate 73 is continuously formed from the region of the blade portion 74 that overlaps the position where the second surface 75*b* is formed in the rotational axis direction. The welded portion in which the welding trace is continuously formed from the position where the second surface 75*b* and the non-welded portion in which the welding trace is not formed on the support plate 73 are formed on the blade portion 74 in the rotational axis direction. The welded portion is located on a side closer to the center in the longitudinal direction of the blade portion 74 than the non-welded portion.

While the first and second exemplary embodiments illustrate a color electrophotographic image forming apparatus by way of example, a monochromatic electrophotographic image forming apparatus can also be applied.

The elements described above in the exemplary embodiments may be arbitrarily combined to carry out the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A color developing device to be used for a color image forming apparatus, the color developing device comprising:

a developing frame configured to store a color developer, wherein a polarity of the color developer is set to a positive polarity; and a developing member configured to rotate and to carry the color developer, wherein a support plate extends in a first direction which is a rotational axis direction of the developing member and is fixed to the developing frame with a screw, wherein a plate-like member extends in the first direction and is supported on the support plate, wherein one end portion of the plate-like member in a second direction which is a direction crossing the first direction is opposed to the developing member, and another end portion of the plate-like member in the second direction is welded to the support plate, wherein the plate-like member contacts the developing member to regulate a layer thickness of the color developer on a surface of the developing member, and wherein a welding trace of the plate-like member welded to the support plate extends in the first direction, and when the plate-like member is viewed from a third direction intersecting the first direction and intersecting the second direction, the welding trace overlaps a position where the plate-like member is fastened to the developing frame with the screw in the first direction.

2. The color developing device according to claim 1, wherein the color developer is a yellow developer.

3. The color developing device according to claim 1, wherein the color developer is a magenta developer.

4. The color developing device according to claim 1, wherein the color developer is a cyan developer.

* * * * *